(12) United States Patent
Stamires et al.

(10) Patent No.: US 7,208,446 B2
(45) Date of Patent: *Apr. 24, 2007

(54) QUASI-CRYSTALLINE BOEHMITES CONTAINING ADDITIVES

(75) Inventors: Dennis Stamires, Newport Beach, CA (US); Paul O'Connor, Hoevelaken (NL); Gregory Pearson, Seabrook, TX (US); William Jones, Cambridge (GB)

(73) Assignee: Albemarle Netherlands B. V., Amersfoort (NL)

( * ) Notice: Subject to any disclaimer, the term of this patent is extended or adjusted under 35 U.S.C. 154(b) by 789 days.

This patent is subject to a terminal disclaimer.

(21) Appl. No.: 10/298,734

(22) Filed: Nov. 18, 2002

(65) Prior Publication Data

US 2006/0096891 A1 May 11, 2006

Related U.S. Application Data

(63) Continuation-in-part of application No. 09/636,690, filed on Aug. 11, 2000, now Pat. No. 6,503,867, which is a continuation-in-part of application No. 09/372,558, filed on Aug. 11, 1999, now abandoned.

(51) Int. Cl.
*B01J 23/00* (2006.01)
*B01J 21/02* (2006.01)
*B01J 27/14* (2006.01)
*C04B 35/10* (2006.01)
*C01F 7/02* (2006.01)

(52) U.S. Cl. .............. 502/355; 502/335; 502/205; 502/208; 502/232; 502/302; 502/341; 502/351; 50/355; 423/600; 423/275; 423/625; 423/628; 423/629; 501/127

(58) Field of Classification Search ............... 502/335, 502/205, 208, 232, 302, 341, 351, 355; 501/127; 423/600, 275, 625, 628, 629
See application file for complete search history.

(56) References Cited

U.S. PATENT DOCUMENTS 3,357,791 A 12/1967 Napier .................... 23/143
4,117,105 A 9/1978 Hertzenberg et al. ....... 423/625

(Continued)

FOREIGN PATENT DOCUMENTS

EP 0 130 835 A2 1/1985
EP 0 597 738 A1 5/1994

OTHER PUBLICATIONS

J. Medena, J. Catalysis, vol. 37 (1975), 91-100, no month.

(Continued)

*Primary Examiner*—J. A. Lorengo
*Assistant Examiner*—Patricia L. Hailey
(74) *Attorney, Agent, or Firm*—Frank C. Eymard

(57) ABSTRACT

The present invention pertains to a quasi-crystalline boehmite containing additive in a homogeneously dispersed state. Suitable additives are compounds containing elements selected from the group of alkaline earth metals, alkaline metals, rare earth metals, transition metals, actinides, silicon, gallium, boron, titanium, and phosphorus. Said QCBs according to the invention may be prepared in several ways. In general, a quasi-crystalline boehmite precursor and an additive are converted to a quasi-crystalline boehmite containing the additive in a homogeneously dispersed state.

72 Claims, 4 Drawing Sheets

U.S. PATENT DOCUMENTS

| | | | |
|---|---|---|---|
| 4,248,852 A * | 2/1981 | Wakabayashi et al. | 423/626 |
| 4,318,896 A * | 3/1982 | Schoonover | 423/628 |
| 4,344,928 A * | 8/1982 | Dupin et al. | 423/626 |
| 4,676,928 A * | 6/1987 | Leach et al. | 516/93 |
| 4,797,139 A | 1/1989 | Bauer | 51/293 |
| 5,194,243 A | 3/1993 | Pearson et al. | 423/625 |
| 5,219,806 A * | 6/1993 | Wood | 501/127 |
| 5,718,879 A | 2/1998 | Chopin et al. | 423/628 |
| 5,800,797 A * | 9/1998 | Matsumoto et al. | 423/625 |
| 5,972,820 A * | 10/1999 | Kharas et al. | 501/127 |
| 6,027,706 A * | 2/2000 | Pinnavaia et al. | 423/600 |
| 6,262,132 B1 * | 7/2001 | Singleton et al. | 518/715 |
| 6,503,867 B1 * | 1/2003 | Stamires et al. | 502/335 |
| 6,506,358 B1 * | 1/2003 | Stamires et al. | 423/625 |
| 6,555,496 B1 * | 4/2003 | Stamires et al. | 502/327 |
| 6,689,333 B1 * | 2/2004 | Stamires et al. | 423/275 |
| 6,716,785 B2 * | 4/2004 | Stamires et al. | 502/84 |

OTHER PUBLICATIONS

J. Wachowski, et al., *Materials Chemistry*, vol. 37, (1994), 29-38, no month.

G. Yamaguchi, et al., *Bull. Chem. Soc. Jap.*, vol. 32 (1959), 696-699, no month.

G. Yamaguchi, et al., *J. Chem. Soc. Jap.*, (*Ind. Chem. Soc.*), (1963), English Translation, 21 pages, no month.

* cited by examiner

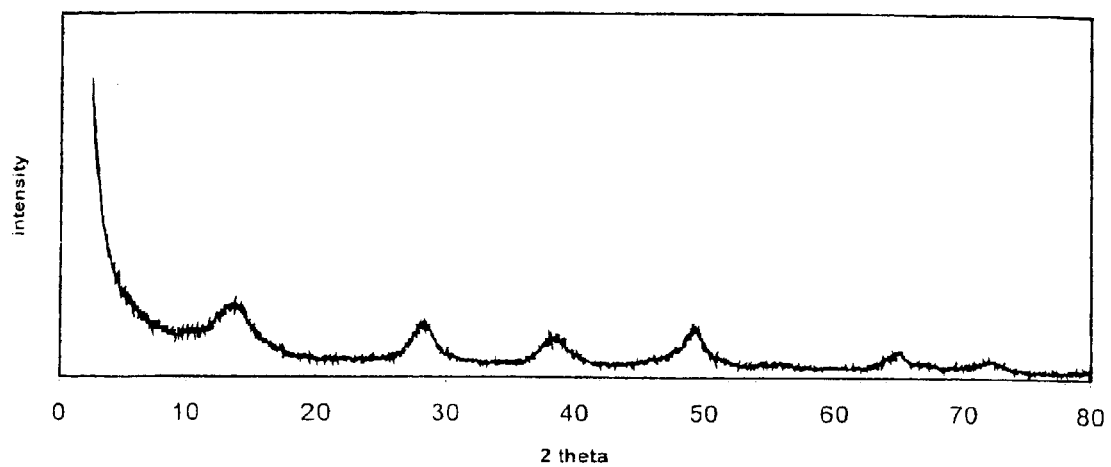
Figure 1. XRD of Catapal
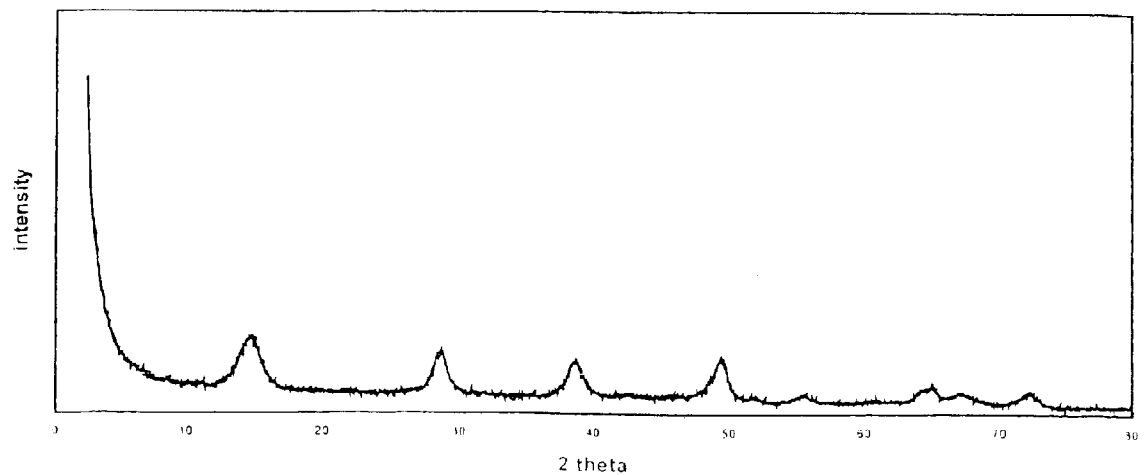
Figure 2 QCB with Zn

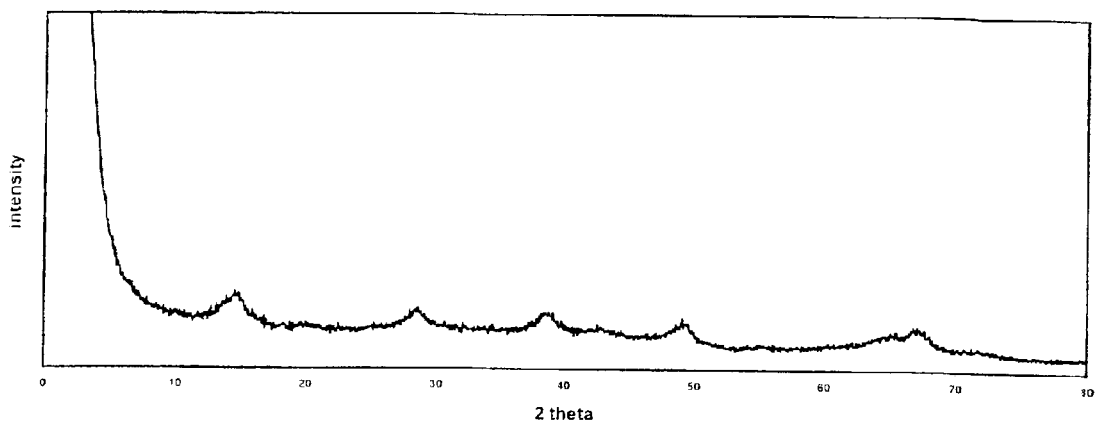
Figure 3 QCB with Si
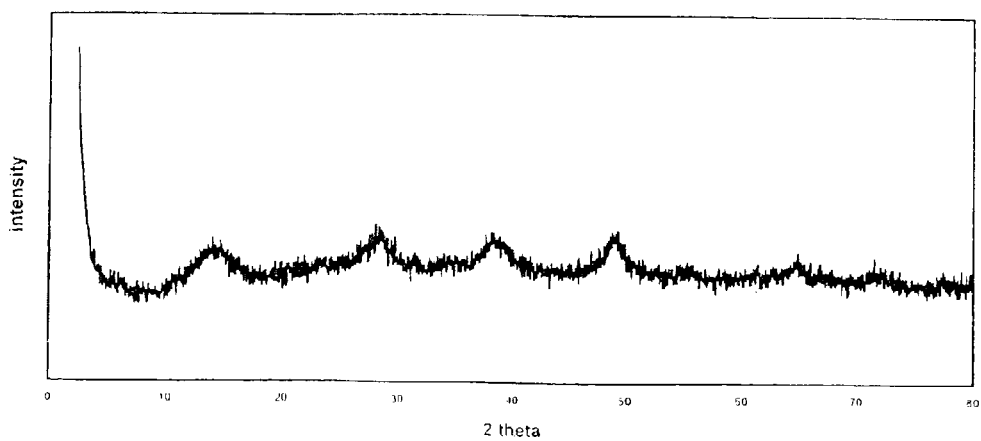
Figure 4 QCB with Ni and Co

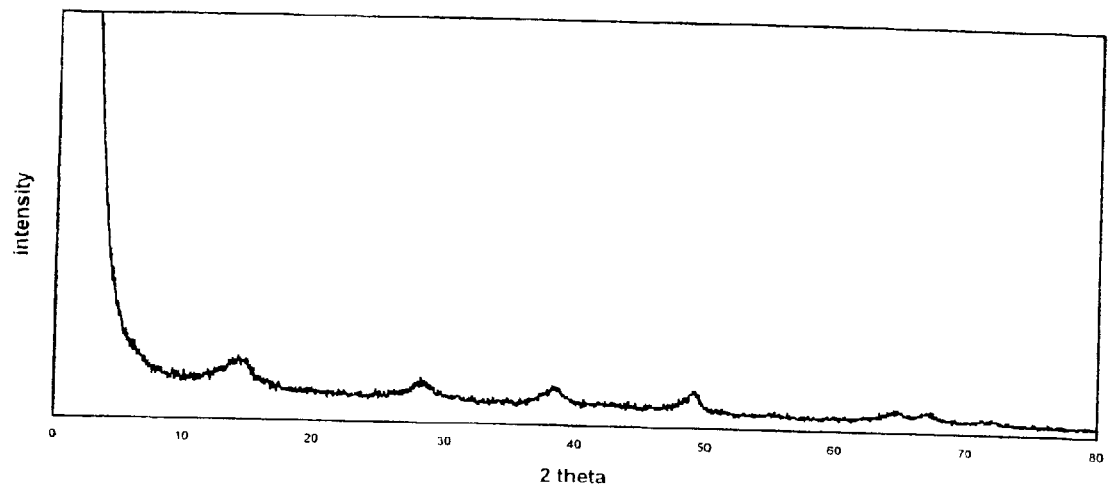
Figure 5 QCB with Mo
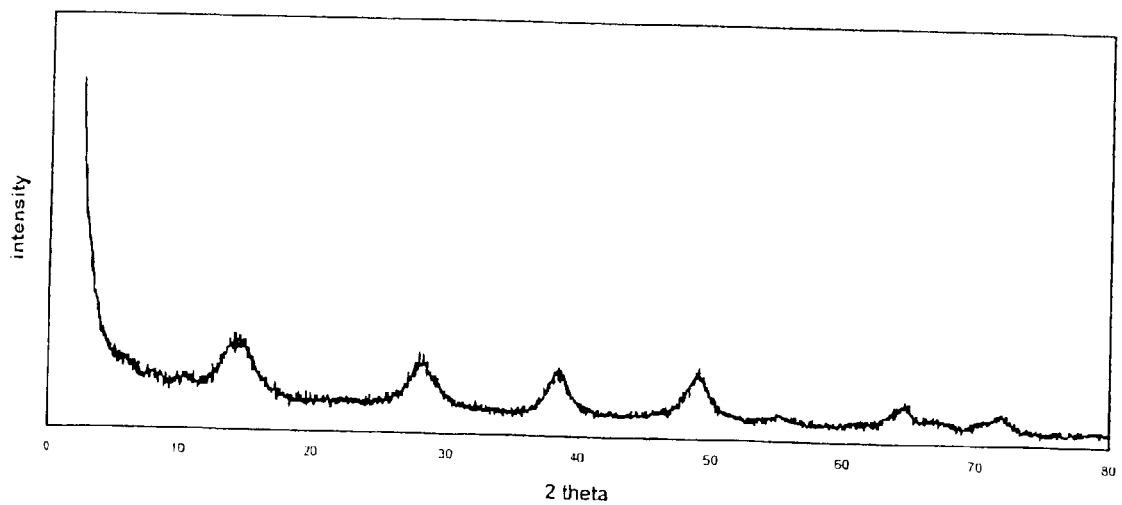
Figure 6 QCB with Ga

Figure 7 QCB with Ba

US 7,208,446 B2

QUASI-CRYSTALLINE BOEHMITES CONTAINING ADDITIVES

CROSS REFERENCE TO RELATED APPLICATIONS

This application is a continuation-in-part of U.S. application Ser. No 09/636,690, filed Aug. 11, 2000 now U.S. Pat. No. 6,503,867, which is a continuation-in-part of U.S. application Ser. No. 09/372,558, filed Aug. 11, 1999 now abandoned.

BACKGROUND OF THE INVENTION

1. Field of the Invention

The present invention pertains to quasi-crystalline boehmites containing additives.

2. Description of the Prior Art

Alumina, alpha-monohydrates or boehmites and their dehydrated and or sintered forms are some of the most extensively used aluminum oxide-hydroxides materials. Some of the major commercial applications, for example, ceramics, abrasive materials, fire-retardants, adsorbents, catalysts fillers in composites, and so on, involve one or more forms of these materials. Also, a substantial portion of commercial boehmite aluminas is used in catalytic applications such as refinery catalysts, catalyst for hydroprocessing hydrocarbon feeds, reforming catalysts, pollution control catalysts, cracking catalysts. The term "hydroprocessing" in this context encompasses all processes in which a hydrocarbon feed is reacted with hydrogen at elevated temperature and elevated pressure. These processes include hydrodesulphurisation, hydrodenitrogenation, hydrodemetallisation, hydrodearomatisation, hydro-isomerisation, hydrodewaxing, hydrocracking, and hydrocracking under mild pressure conditions, which is commonly referred to as mild hydrocracking. This type of alumina is also used as a catalyst for specific chemical processes such as ethylene-oxide production and methanol synthesis. Relatively more recent commercial uses of boehmite types of aluminas or modified forms thereof involve the transformation of environmentally unfriendly chemical components such as chlorofluorohydrocarbons (CFCs) and other undesirable pollutants. Boehmite alumina types are further used as catalytic material in the combustion of gas turbines for reducing nitrogen oxide.

The main reason for the successful extensive and diversified use of these materials in such variety of commercial uses is their flexibility, which enables them to be tailor-made into products with a very wide range of physical-chemical and mechanical properties.

Some of the main properties which determine the suitability of commercial applications involving gas-solid phase interactions such as catalysts and adsorbents are pore volume, pore size distribution, pore texture, specific density, surface areas, density and type of active center, basicity and acidity, crushing strength, abrasion properties, thermal and hydrothermal aging (sintering), and long-term stability.

By and large, the desired properties of the alumina product can be obtained by selecting and carefully controlling certain parameters. These usually involve: raw materials, impurities, precipitation or conversion process conditions, aging conditions and subsequent thermal treatments (calcination/steaming), and mechanical treatments.

Nevertheless, in spite of this wide and diversified range of existing know-how, this technology is still under development and presents unlimited scientific and technological challenges to both the manufacturers and the end-users for further development of such alumina-based materials.

The term boehmite is used in the industry to describe alumina hydrates which exhibit XRD patterns close to that of aluminum oxide-hydroxide [AlO(OH)], naturally occurring boehmite or diaspore. Further, the general term boehmite tends to be used to describe a wide range of alumina hydrates which contain different amounts of water of hydration, have different surface areas, pore volumes, and specific densities, and exhibit different thermal characteristics upon thermal treatment. Yet although their XRD patterns exhibit the characteristic boehmite [AlO(OH)] peaks, their widths usually vary and they can also shift location. The sharpness of the XRD peaks and their locations have been used to indicate the degree of crystallinity, crystal size, and amount of imperfections.

Broadly, there are two categories of boehmite aluminas. Category I, in general, contains boehmites which have been synthesized and/or aged at temperatures close to 100° C., most of the time under ambient atmospheric pressure. In the present specification, this type of boehmite is referred to as quasi-crystalline boehmite. The second category of boehmites consists of so-called micro-crystalline boehmites.

In the state of the art, category I boehmites, i.e. quasi-crystalline boehmites, are referred to interchangeably as: pseudo-boehmites, gelatinous boehmites or quasi-crystalline boehmites (QCBs). Usually, these QCB aluminas have very high surface areas, large pores and pore volumes, and lower specific densities than microcrystalline boehmites. They disperse easily in water of acids, have smaller crystal sizes than micro-crystalline boehmites, and contain a larger number of water molecules of hydration. The extent of hydration of the QCB can have a wide range of values, for example from about 1.4 up, and about 2 moles of water per mole of Al0, usually intercalated orderly or otherwise between the octahedral layers.

The DTG (differential thermographimetry) curves of the water release from the QCB materials as a function of temperature show that the major peak appears at much lower temperatures compared to that of the much more crystalline boehmites.

The XRD patterns of QCBs show quite broad peaks, and their half-widths are indicative of the crystal size as well as the degree of crystal perfection.

The broadening of the widths at half-maximum intensities varies substantially and for the QCBs typically can be from about 2°–6° to 2θ. Further, as the amount of water intercalated in the QCB crystals is increased, the main (020) XRD reflection moves to lower 2θ values corresponding to greater d-spacings. Some typical, commercially available QCB's are: Condea Pural®, Catapal® and Versal® products.

The category II boehmites consist of microcrystalline boehmites (MCBs), which are distinguished from the QCBs by their high degree of crystallinity, relatively large crystal sizes, very low surface areas, and high densities. Unlike the QCBs, the MCBs show XRD patterns with higher peak intensities and very narrow half-peak line widths. This is due to the relatively small number of intercalated water molecules, large crystal sizes, higher degree of crystallization of the bulk material, and smaller amount of crystal imperfections present. Typically, the number of intercalated molecules of water can vary from about 1 up to about 1.4 per mole of Al0. The main XRD reflection peaks (020) at half-length of maximum intensity have widths from about 1.5 down to about 0.1 degree 2-theta (2θ). For the purpose of this specification we define quasi-crystalline boehmites as having 020 peak widths at half-length of the maximum intensity of 1.5 or greater than 1.5°. Boehmites having a (020) peak width at half-length of maximum intensity smaller than 2 are considered micro-crystalline boehmites.

A typical commercially available MCB product is Condea's P-200® grade of alumina. Overall, the basic, characteristic differences between the QCB and MCB types of boehmites involve variations in the following: 3-dimensional lattice order, sizes of the crystallites, amount of water intercalated between the octahedral layers, and degree of crystal imperfections.

As for the commercial preparation of these boehmite aluminas, QCBs are most commonly manufactured via processes involving:

Neutralization of aluminum salts by alkalines, acidification of aluminate salts, hydrolysis of aluminum alkoxides, reaction of aluminum metal (amalgamated) with water, and rehydration of amorphous rho-alumina obtained by calcining gibbsite. The MCB types of boehmite aluminas in general are commercially produced by hydrothermal processes using temperatures usually above 150° C. and autogeneous pressures. These processes usually involve hydrolysis of aluminum salts to form gelatinous aluminas, which are subsequently hydrothermally aged in an autoclave at elevated temperatures and pressures. This type of process is described in U.S. Pat. No. 3,357,791. There are several variations on this basic process involving different starting aluminum sources, additions of acids or salts during the aging, and a wide range of process conditions.

MCBs are also prepared using hydrothermal processing of gibbsite. Variations on these processes involve: addition of acids, alkaline metals, and salts during the hydrothermal treatment, as well as the use of boehmite seeds to enhance the conversion of gibbsite to MCB. These types of processes are described in Alcoa's U.S. Pat. No. 5,194,243, in U.S. Pat. No. 4,117,105 and in U.S. Pat. No. 4,797,139.

Nevertheless, whether pseudo-, quasi- or microcrystalline, such boehmite materials are characterized by reflections in their powder X-ray. The ICDD contains entries for boehmite and confirms that there would be reflections corresponding to the (020), (021), and (041) planes. For copper radiation, such reflections would appear at 14, 28, and 38 degrees 2-theta. The various forms of boehmite would be distinguished by the relative intensity and width of the reflections. Various authors have considered the exact position of the reflections in terms of the extent of crystallinity. Nevertheless, lines close to the above positions would be indicative of the presence of one or more types of boehmite phases.

U.S. Pat. No. 5,972,820 (Kharas) discloses the preparation of δ-alumina from a pseudo-boehmite. The only alumina compound disclosed in this document that contains other components, such as promoters, activators, and catalytically active metals (col. 8, line 57 to column 10, line 21), is delta-alumina (δ-alumina). As illustrated in col. 5, line 9, δ-alumina is an intermediate in the transformation of boehmite (AlOOH), via gamma-alumina to alpha-alumina. In this transformation, δ-alumina is an intermediate between gamma- and alpha-alumina. Since δ-alumina is derived from a boehmite precursor it is not in itself a boehmite or (pseudo)boehmite.

Pages 225–227 of the *Kirk Othmer Encyclopedia of Chemical Technology* (Third Edition, Vol. 2, 1978), shows in FIG. 5 that a gamma, delta, eta and alpha alumina are formed by high-temperature decomposition of boehmite, the decomposition sequence being equal to the sequence presented by Kharas. This is further indication that δ-alumina is a decomposition product of boehmite and therefore a different type of alumina than boehmite.

U.S. Pat. No. 6,027,706 (Pinnavaia) discloses the preparation of a synthetic mesostructured alumina composition from, e.g., pseudo-boehmite (col. 8, lines 18–24 and column 17, scheme 4). It is further mentioned that the mesostructured alumina compositions can be impregnated with several metals. An XRD pattern of such a mesostructured alumina is presented in, e.g., FIGS. 1A, 1B, and 10. These patterns were measured using copper radiation (col. 18, line 34).

As mentioned above, the (020) reflection of boehmite appears at 14 degrees 2-theta when using copper radiation. In the XRD patterns of Pinnavaia, no peak can be identified at 14 degrees 2-theta. Hence, Pinnavaia's mesostructured aluminas do not show the (020) boehmite reflection and also differ from the quasi-crystalline boehmites according to the present invention.

In the prior art, we find QCBs containing metal ions which have been prepared by hydrolysis of alumina isopropoxide with co-precipitation of lanthanides, as described in the paper by J. Medena, *J. Catalysis*, Vol. 37 (1975), 91–100, and J. Wachowski et al., *Materials Chemistry*, Vol. 37 (1994), 29–38. The products are pseudo-boehmite type aluminas with the occlusion of one or more lanthanide metal ions. These materials have been used primarily in high-temperature commercial applications where the presence of such lanthanide metal ions in the pseudo-boehmite structure retards the transformation of the gamma-alumina to the alpha-alumina phase. Therefore, a stabilization of the gamma phase is obtained, i.e. a higher surface area is maintained before conversion to the refractory lower surface area alpha-alumina. Specifically, Wachowski et al. used the lanthanide ions (La, Ce, Pr, Nd, Sm) in quantities from 1% to 10% by weight, calcined at temperatures in the range of 500° C. to 1200° C. No information is provided by Wachowski et al. regarding the state and properties of the materials below 500° C., which is the most important area for catalytic applications.

Also, EP-A1-0 597 738 describes the thermal stabilization of alumina by the addition of lanthanum, optionally combined with neodymium. This material is prepared by aging flash-calcined Gibbsite in a slurry with a lanthanum salt at a temperature between 70 and 110° C., followed by a thermal treatment at a temperature between 100 and 1000° C.

These products, like the products produced by Wachowski et al., all are high-temperature refractory (ceramic) materials which because of their bulk structures of extremely high density, very low surface areas, and small pores find very limited application in heterogeneous catalysis, especially for catalysts used in hydrocarbon conversion or modification, for example FCC and hydroprocessing commercial applications.

Further, EP-A-0 130 835 describes a catalyst comprising a catalytically active metal supported on a lanthanum or neodymium-$\beta$-$Al_2O_3$ carrier. Said carrier is obtained by the precipitation of aluminum nitrate solution with ammonium hydroxide in the presence of a lanthanum, praseodymium or neodymium salt solution. As the precipitated amorphous material is directly washed with water and filtered, the alumina is not allowed to age with time under the usual conditions and a certain pH, concentration, and temperature, so that it crystallizes to a boehmite alumina structure.

SUMMARY OF THE INVENTION

In one embodiment the present invention is directed to a composition comprising quasi-crystalline boehmite and an additive present in a homogeneously dispersed state. The additive is selected from the group consisting of alkaline earth metals, transition metals, actinides, noble metals, gallium, boron, phosphorus, silicon, metal oxides, hydroxides, mixed oxides, clays, zeolites, spinels, perovskites, organic and inorganic acids and salts and mixtures thereof. The quasi-crystalline boehmite has a peak width at half length of the maximum intensity of the (020) XRD reflection of 1.5 or greater than 1.5 degrees 2-theta.

In another embodiment the present invention comprises a process for the preparation of the above quasi-crystalline boehmite comprising converting a quasi-crystalline boehmite precursor and an additive to a quasi-crystalline boehmite containing an additive in a homogeneously dispersed state.

Other objectives and embodiments of our invention encompass details about compositions, manufacturing steps, uses of the compositions of the invention, etc., all of which are hereinafter disclosed in the following discussion of each of the facets of the present invention.

BRIEF DESCRIPTION OF THE DRAWINGS

FIG. 1 is an X-ray diffractogram (XRD) for the spectrum of Catapal A® of Vista Chemicals.

FIG. 2 is the XRD pattern of the QCB formed in the procedure of Example 2.

FIG. 3 is the XRD pattern of the QCB formed in the procedure of Example 3.

FIG. 4 is the XRD pattern of the QCB formed in the procedure of Example 4.

FIG. 5 is the XRD pattern of the QCB formed in the procedure of Example 10.

FIG. 6 is the XRD pattern of the QCB formed in the procedure of Example 11.

FIG. 7 is the XRD pattern of the MCB formed in the procedure of Example 12.

DETAILED DESCRIPTION OF THE INVENTION

The scope of this invention is to produce (QCB)s which have larger pore volume (PV), pore size (PS), surface area (SA), acidity, basicity, binding properties and increased thermal and hydrothermal stability by using additives together with the QCB-precursors during the formation of the (QCB)s.

Because of the diversified nature of the effects desired in this invention, the nature of the additives used is also quite diversified. The additive present in the QCB according to the invention helps to adjust the QCB's physical, chemical, and catalytic properties such as specific density, surface area, pore volume, pore size distribution, density and type of active centers, basicity and acidity, crushing strength, abrasion properties, etc., which determine the boehmite's suitability for use in catalytic or absorbent material. For example, in general, metals from the alkaline earth, transition and rare earth groups are used to improve thermal and hydrothermal stability as well as introducing some catalytic activity. Other additive ingredients primarily are used to increase surface area, pore volume, pore sizes, binding properties, etc. Therefore, different additives with different functionality can be used, and more than one additive, organic or inorganic, or both, can be used in order to modify and adjust the physico-chemical properties of the QCB product. Additionally, some of these additives can function as seeds with regard to the formation of QCB.

The fact that the additive is homogeneously dispersed within the QCB distinguishes the QCBs according to the invention from QCBs which have been impregnated with additives, and renders these new QCBs extremely suitable for catalytic purposes or as starting materials for the preparation of catalysts for heterogeneous catalytic reactions. For the purpose of the invention, it is stated that a homogenous dispersion of the additive is present in the QCB if the X-ray diffraction pattern has no reflections of the additive, and thus the additive is not present as a separate phase. It is, of course, possible to incorporate different types of additives into the QCB according to the invention.

Suitable additives are compounds containing elements selected from the group of alkaline earth metals, alkaline metals, transition metals, rare-earth metals, noble metals such as Pt and Pd, actinides, silicon, gallium, boron, titanium, zirconium, phosphorus and mixtures thereof. For instance, the presence of silicon increases the amount of acidic sites in the boehmite, transition metals introduce catalytic or absorbing activity such as $SO_x$ captivation, $NO_x$ captivation, hydrogenation, hydroconversion, and other catalytic systems for gas/solid interactions.

Suitable anions for the above compounds include nitrates, sulfates, chlorides, formates, acetates, oxalates, gluconate, carbonates, vanadates, etc. The use of compounds with decomposable anions is preferred, because the resulting QCBs with additive can be dried directly, without any washing, as anions undesirable for catalytic purposes are not present.

In addition to the additives mentioned above, rare earth metal-containing compounds may be present in the quasi-crystalline boehmite in combination with any of the above additives.

Additives which in water dispersions form gels or sols are also used as such or in combinations with the above additives. Such compounds, organic or inorganic, include, but not limited to, sugars, carboxylates, polymers, surfactants, ACH, ANH, gums, urea, starches, natural and synthetic clays of the smectite montmorrilonite types, hectorite, bentones, laponite, bentonite, modified clays, anionic clays, cationic clays, saponite, silica sols, silica-alumina, titania-alumina, alumina-phosphate, pillared clay, alumina-aluminum phosphate, phosphated clays, modified kaolinite clays, calcined clays, delaminated clays, leached clays, exfoliated clays, flash calcined clays, and mixtures thereof.

Additionally, other types of additives can be used which include the synthetic zeolites of the small pore pentasil-type such as ZSM and Beta, Sapo and Alpo, the synthetic zeolites of the faujasite type, NaX, NaY, their ion exchanged and stabilized forms, and the large-pore mesoporous types in particular MCM-41, VIP-5, ITQ-21, and their ion exchanged and stabilized forms.

More than one additive can be used in this invention and the additives can be incorporated all together at a particular stage of the processing or at different stages.

One embodiment of this invention involves the milling of the additive(s) in order to reduce the particle size before used in the process of this invention.

Another objective of this invention is to describe a process which is cost effective for producing quasi-crystalline boehmites containing additives. An economical commercial process demands large throughput capacity, low temperatures, short reaction times, and operating in a continuous mode.

As known in the prior art, the kinetics of converting alumina trihydrates (gibbsite, BOC) and flash calcined gibbsite to boehmite are accelerated by adding a base to the slurry before aging and using higher temperature hydrothermal conditions. Unfortunately, although fast and complete conversions can be obtained by using such conditions, the boehmite formed is highly crystalline, has large crystal size, much lower surface areas, and smaller pore volumes. Further, this type of boehmite alumina (MCB) has not binding properties.

Contrary to this, the present invention aims towards producing boehmite-type alumina, with a much larger surface area, larger pore volumes, larger pore size, and with higher binding properties. However, to produce this type of alumina in a cost-effective way, that is, faster and with higher conversions, one needs to utilize the conditions used when microcrystalline boehmites (MCBs) are produced, that is, higher temperatures, hydrothermal conditions and higher pHs, but these conditions cannot be used for producing the products of this invention (i.e., QCB-containing additives) since this will result in the formation of MCB (microcrystalline boehmite) rather than the QCBs. Therefore, there is a need to develop favorable conditions which will improve the kinetics for forming QCB additives while the formation of MCB types is minimized.

Our invention allows for the use of conditions that improve the kinetics and form QCBs without forming MCBs. Specifically, one embodiment involves hydrothermal conditions using temperatures above 100° C. and relatively short crystallization times, which allow for operating in a continuous mode and can be used to produce the products of this invention, provided, however, that additives/seeds are used at the appropriate times and places. These additives counteract the tendency of high pHs, high temperatures and higher crystallization times that enhance the production of MCB rather than the QCBs.

Therefore, the use of additives (and seeds as will be later discussed) in our invention allows the use of favorable conditions that improve the kinetics of converting boehmite-precursors to QCB without forming MCB.

The second advantage of using the additives of our invention is to stabilize the products of this invention so that when calcined and/or steamed, or aged during processing in catalytic or adsorption commercial services, they deactivate at slower rates, thus maintaining a higher surface area, pore volume, and activities, and show higher resistance to deactivation.

Another advantage of this invention is that by using the additives and/or seeds described in this invention, the quasi-crystalline doped boehmites produced have higher stability, larger surface areas and larger pore volumes than the quasi-crystalline boehmites which do not contain such additives and/or seeds. Therefore, the products of this invention having larger surface areas and pore volumes when placed in commercial service as catalysts or sorbents can withstand the deactivation conditions of the catalytic and regeneration refinery units for longer periods of time while maintaining higher activities, since they are more stable and the surface areas and pore volumes of the fresh catalyst or sorbent are initially much larger.

The QCBs according to the invention can be prepared in several ways. In general, a quasi-crystalline boehmite precursor and an additive are converted to a quasi-crystalline boehmite containing the additive in a homogeneously dispersed state. Examples of suitable preparation processes are described below:

Process 1

The QCB can be prepared by hydrolyzing and aging an aluminum alkoxide in the presence of a compound containing the desired additive(s). The additive can be incorporated during the hydrolysis step or added at the end before the aging step.

Process 2

The QCB can be prepared by hydrolysis and precipitation as hydroxides of soluble aluminum salts and aged to form a QCB containing additive. Examples of suitable aluminum salts are aluminum sulfate, aluminum nitrate, aluminum chloride, sodium aluminate, and mixtures thereof. The additive(s) may be added while the hydrolysis and coprecipitation are going on or at the end in the aging step.

Process 3

The QCB can also be prepared by aging a slurry containing a thermally treated form of aluminum trihydrate and additive(s) at temperatures ranging from 80 to 130° C. for a time sufficient to form QCBs, preferably at a temperature between 90 and 110° C. Thermally treated forms of aluminum trihydrate are calcined aluminum trihydrate and flash calcined aluminum trihydrate (CP® alumina). This preparation method has the advantage that no ions are introduced into the QCB apart from any ions present in the additive compound. That means that with the appropriate choice of additive compounds washing steps can be reduced or avoided altogether. For instance, when decomposable anions (such as carbonates, nitrates, and formates) are used, the QCB containing additive can be dried directly, as cations undesirable for catalytic purposes are not present. A further advantage of this preparation method is that it is possible to first shape a slurry containing a thermally treated form of aluminum trihydrate and additive, reslurry the shaped bodies, and subsequently age the shaped bodies to form QCBs. Shaping is defined in this specification as any method of obtaining particles with the appropriate size and strength for the specific purpose. Suitable shaping methods are spray-drying, extrusion (optionally with intermediate spray-drying, filterpressing, or kneading), pelletizing, beading or any other conventional shaping method used in the catalyst or absorbent field and combinations thereof.

Process 4

The QCB can also be prepared by aging a slurry containing amorphous gel alumina and additive(s) at temperatures ranging from 80 to 130° C., preferably at a temperature between 90 and 110° C., to form QCBs. Like process 3 mentioned above, this preparation method also has the advantage that no ions are introduced into the QCB apart from the ions of the additive compound. This means that with the appropriate choice of additive compounds washing steps can be reduced or avoided altogether. Also, it is possible to first shape a slurry containing amorphous alumina gel and additive, reslurry the shaped bodies, and subsequently age the shaped bodies to form QCBs. In this case care must be taken to choose a shaping step in which the amorphous gel alumina/additive mixture is not heated to a temperature exceeding the aging temperature.

Process 5

QCBs according to the invention can also be prepared by aging a relatively amorphous QCB by thermal or hydrothermal treatment in the presence of compounds of the desired additive to form a QCB containing additive in a homogeneously dispersed state. The crystallinity increases to some extent, but the resulting product is still a QCB according to the definition of the present description. This process also allows shaping of the QCB-additive mixture before the (hydro)thermal treatment. Further, no ions other than the ions of the additive compound are introduced into the QCB.

Process 6

QCBs may also be prepared by aging alumina trihydrates such as gibbsite, BOC, and bayerite by hydrothermal treatment, with the aid of suitable boehmite seeds in the presence of compounds of the desired additives. Suitable seeds are the known seeds to make microcrystalline boehmite such as commercially available boehmite (Catapal®, Condea® Versal, P-200®, etc.), amorphous seeds, milled boehmite seeds, boehmite prepared from sodium aluminate solutions, flash calcined Gibbsite, etc. Also quasi-crystalline boehmites prepared by one of the processes described here can suitably be used as a seed. Like processes 3, 4, and 5 no ions other than the ions of the additive are introduced into the QCB, and this process allows shaping prior to the aging step.

Although processes 5 and 6 described above are known for the preparation of microcrystalline boehmites, we found that they can be adapted to form QCBs by adjusting the seed used, the pH, and the hydrothermal conditions.

Process 7

QCBs may also be prepared by:
a. Pretreating an alumina source with an acid to form a boehmite precursor;
b. Adding a base or alkaline compound to the boehmite precursor in an amount at least sufficient to neutralize the acid of step a.; and
c. Aging the boehmite precursor at a temperature above about 65° C. for a time sufficient to obtain said quasi-crystalline boehmite.

The additive may be added to the boehmite precursor at one or more of steps a., b. or c.

With regard to Process 7, the following applies:
The boehmite precursor may be aged before or after step b.
The precursor may be homogenized in one or more of steps a, b or c by milling.
The base or alkaline compound is selected from the group consisting of sodium hydroxide, lithium hydroxide, potassium hydroxide, ammonium hydroxide, sodium carbonate, sodium silicate, sodium aluminate, sodium metasilicate, sodium-containing phosphates, ammonium containing phosphates, magnesium hydroxide, calcium hydroxide and barium hydroxide.

The first publications on the use of seeds in the hydrothermal conversion of aluminum trihydrate date back in the late 1940's/early 1950's. For example, G. Yamaguchi and K. Sakamato (1959), clearly demonstrate the concept that boehmite seeds substantially improved the kinetics of the hydrothermal conversion of gibbsite to boehmite, by lowering the temperature, shortening the reaction time, and increasing the gibbsite conversion.

Also the beneficial principle of seeding with boehmite in the hydrothermal transformation of gibbsite in an autoclave operating at elevated temperatures and autogeneous pressures was also demonstrated clearly by G. Yamaguchi and H. Yamanida (1963).

There are several other publications in the open literature, in which equally well the benefits of seeding with boehmite and/or alkaline solutions are demonstrated. Further, the use of boehmite seed is also claimed to produce finer particle size boehmite product which is easier to disperse in water. The use of boehmite seeds in the hydtrothermal conversion of gibbsite has been described in U.S. Pat. No. 4,797,139 and in U.S. Pat. No. 5,194,243.

A variety of kinds of seeding materials can be used in conjunction with the Additive(s) described above, and more than one type of seed can be used, seeds can be crystalline or amorphous. Preferred seeding materials include, but are not limited to, Boehmite Alumina, doped Boehmite Alumina, gel Alumina, amorphous Alumina, calcined Alumina, flash calcined Gibbsite, Silica-Alumina, Silica, Magnesia, Magnesia-Silica, Magnesia-Silica-Alumina, Calcium Silicates, Calcium Aluminates, Calcium Magnesium, Lithium-Alumina, Magnesium-Alumina, Sodium-Alumina-Silica, Sodium-Calcium-Magnesium, Sodium-Magnesium-Alumina-Silica or seeds used to synthesize small pore and large pore zeolites, and mixtures thereof.

Also pretreated compositions of the above materials are useful as seeds, for example, aged Magnesium-Silica-Alumina which is converted to a Smectite clay, like Saponite, and subsequently used as a seed, or Magnesia-Alumina, which is aged to form an Anionic Clay (Hydrotalcite) and is used as a seed.

Seeds may be modified before use, mechanically, thermally, and/or chemically. For example, but not limited to, Flash Calcined Gibbsite is hydrated in water in the presence of a Sodium Silicate Additive before use as a seed, or in another example, Flash Calcined Gibbsite is hydrated in water to which caustic soda and a gelling agent such as synthetic Sapomite are added.

Other types of seeds can also be used such as Sodium-Aluminum-Silicates used in the formation of zeolites (i.e., zeolites such as type A, X, Y, ZSM, Beta), which may be colloidal as well as small particle zeolites containing sodium or ammonium or other exchangeable cations, such as rare earth and/or transition metal cations.

The synthetic or natural clays may be used as seeds, or used as seeds after chemical modifications such as ion exchange, exfoliation, delamination, and pillaring, etc.

Recycled product, which is a QCB type of Alumina, may also be used as seeds.

Further, other types of seeds that can be used in this invention are the seeds used to synthesize the small pore zeolites of the pentasil type such as, for example, ZSM-5, and Beta, the seeds used to synthesize the faujasite type of zeolites such as NaX and NaY, and also the seeds used to synthesize the large pore mesoporous zeolites like the MCM-41, VIP-5, and ITQ-21.

Additionally, the crystalline zeolites themselves can also be used as seeds, preferably when they have small particle sizes, as they can be synthesized with small size or can be milled to reduce the size of the crystals before used as seeds. Further, said zeolites can be ion exchanged with various metal ions, and/or stabilized by various techniques known to the state of the art before they are used as seeds in the present invention. For example, large pore mesoporous zeolites can be ion exchanged and stabilized according to the teachings of the U.S. patent application Ser. No. 09/792,017, filed Feb. 21, 2001 and published on Feb. 14, 2002 as publication No. 20020018747, incorporated herein by reference.

Mixtures of seeds of different types may be used.

In all the above-described processes an intermediate calcination, prior to the aging step may be applied.

All the processes described above may be conducted batch-wise or in a continuous mode, optionally in a continuous multi step operation. The processes may be conducted partly continuous, partly batchwise.

The main Alumina Feed is Aluminum Trihydrate, BOC, or Bauxite and Calcined or Flash Calcined forms thereof, which can be used as such, or in mixtures. Other types of Aluminum sources include, but not limited to, amorphous Alumina, calcined Alumina, flash calcined trihydrate, Alumina gels, Alumina sols, soluble compounds containing Alumina, including aluminum sulfate, aluminum chloride, aluminum hydrols, sodium aluminate and so on. One or more of the feeds can be pretreated before use to form the QCB. Such pretreatments may be, thermal, mechanical, chemical or combinations of. For example, but not limited to, an acid treatment in slurry with high shear mixing or milling of said slurry.

As mentioned above, more than one type of QCB precursor may be used, although care must be taken that the reaction conditions employed enable the conversion of the precursor to QCB. Said mixture of QCB precursors may be prepared before introduction of the additive, or the various types of precursors may be added in any of the further stages of the reaction.

In the processes for the preparation of the QCBs, according to the invention, more than one aging step may be applied, wherein for instance the aging temperature and/or condition (thermally or hydrothermally, pH, time) is varied.

The mixture containing all or some of the ingredients can be homogenized with high shear mixing or milled and optimally formed to shaped bodies before aging. The ingredients used in the preparation of the following examples purposely were selected to have the smallest commercially available particle size. For example, the Gibbsite used had an average particle size of about 3 microns and the Flash Calcined Gibbsite was Alcoa's grade 1.5 or 3.0 which had average respective particle sizes of about 1.5 or 3.0 microns. The BOC used in the examples was commercial grade that was ground to about 2–3 microns particle size. The slurries containing the ingredients before aging, or before shaping were homogenized using high energy input shear mixing, or ultrasound mixing, or milling. More than one aging step may be used at the same temperatures or at different temperatures. Intermediate mechanical treatments may be conducted to the slurry between the aging steps such as high shear mixing, milling, ultrasound, etc. Further, additives may be added between the aging steps or during any of the aging steps, which can be conducted in the same vessel or in different ones. Further, pH adjustment using bases or acids, organic or inorganic, were also done under high shear mixing or milling at any of the processing steps.

The reaction products of the processes for the preparation of the QCBs, according to the invention, may also be recycled to the reactor, with or without modification, such as by milling or acid peptization.

If more than one type of additive is incorporated into the QCB, the various additives may be added simultaneously or sequentially in any of the reaction steps.

It may be advantageous to add acids or bases to adjust the pH during the hydrolysis, precipitation and/or aging steps. Based on the type of feed(s), type(s) of seeds and kind(s) of Additives, the process provides sufficient flexibility to adjust the pH by adding Acid(s) and/or Base(s) to obtain the optimum pH which under the chosen process conditions, i.e., time and temperature, will produce the desired quality of the QCB product.

Acidic materials include but are not limited to, inorganic acids, organic acids. Preferred are nitric, sulfuric, hydrochloric, phosphoric acid, ammonium hydrogen phosphate, magnesium sulfate, aluminum sulfate, formic, acetic, oxalic, citric, glycolic and so on.

Preferred basic materials are sodium hydroxide, lithium hydroxide, potassium hydroxide, ammonium hydroxide, sodium carbonate, sodium silicate, sodium aluminate, sodium metasilicate, sodium-containing phosphates, magnesium hydroxide, calcium hydroxide and barium hydroxide.

Further, mixtures of Acids or Bases or both in combination with the Additives mentioned above can be used in our process.

As mentioned above, some of the processes for the preparation of the quasi-crystalline boehmites, according to the invention, allow shaping into shaped bodies during preparation, optionally with an intermediate drying or steaming step. It is also possible to shape the final QCB, optionally with the help of binders and/or fillers.

As mentioned above, the QCBs according to the invention are very suitable as components or starting material for catalyst compositions, including a Fischer Tröpsch composition, or catalyst additives. To this end the QCB is combined with, optionally, binders, fillers (e.g. clay such as kaolin, titanium oxide, zirconia, silica, alumina, silica-alumina, bentonite etc.), catalytically active material such as molecular sieves (e.g. ZSM-5, zeolite Y, USY zeolite, REY, REX and REUSY), and any other catalyst components such as for instance pore regulating additives, which are commonly used in catalyst compositions. For some applications it may be advantageous to neutralize the QCB before use as catalyst component, for instance to improve or create pore volume. Further, it is preferred to remove any sodium to a content below 0.1 wt % $Na_2O$. The present invention therefore is also directed to catalyst compositions and catalyst additives comprising the QCB according to the invention.

In a further embodiment of the invention, the QCB may be mixed with other metal oxides or hydroxides, binders, extenders, activators, etc. in the course of further processing to produce absorbents, ceramics, refractories, substrates, and other carriers.

Boehmites are generally used for catalytic and refractory purposes at temperatures between 200 and 1200° C. At these high temperatures the boehmites are usually converted into transition-aluminas. Therefore, the present invention is also directed to transition alumina which is obtainable by thermal treatment of the quasi-crystalline boehmite-containing additive according to the invention and to transition alumina wherein additives not being lanthanides are present in a homogeneously dispersed state. The invention is further directed to transition alumina wherein said additives are compounds containing elements selected from the group of alkaline earth metals, transition metals, actinides, silicon, boron, titanium, and phosphorus.

Included in possible uses for the composition of the present invention are processes for the hydroprocessing of hydrocarbons wherein the hydrocarbons are contacted with a composition comprising the composition of of the invention at hydroprocessing conditions, and, as a type of hydroprocessing, hydrocracking where the hydrocarbons are contacted with a composition comprising the composition of the invention at hydrocracking conditions. Catalytic hydroprocessing and hydrocracking conditions are well known to the art.

With the above-mentioned transition aluminas catalyst compositions or catalyst additives can be made, optionally with the help of binder materials, fillers, etc.

The kinetics of formation and the quality of the QCB-containing additive(s) are determined by the type of reactant(s) (QCB-precursors), types of seeds, type of additives, pHs, concentrations, order of additions, aging time and temperature.

The following non-limiting examples illustrate various embodiments of the present invention and some of the processes and kinds of materials that can be used to produce a wide spectrum of QCB-containing additive(s) that can be used in a variety of commercial applications.

EXAMPLES

Comparative Example 1

An XRD spectrum was made of Catapal A®, ex Vista Chemicals. See FIG. 1.

Example 2

CP® alumina (flash-calcined aluminum trihydrate) was treated with zinc nitrate solution, using 6% Zn (as ZnO), based on $Al_2O_3$ content of the slurry, at a temperature of 200° C. for 1 hour, the pH being 4. FIG. 2 shows the XRD pattern of the QCB formed.

Example 3

CP® alumina (flash-calcined aluminum trihydrate) was treated with a 4% sodium silicate solution as $SiO_2$, based on $Al_2O_3$ content of the slurry, at a temperature of 200° C. for 1 hour, the pH being 4. FIG. 3 shows the XRD pattern of the QCB formed.

Example 4

A QCB was co-precipitated by co-precipitation of aluminum sulfate and sodium aluminate to a final pH of 10 at a temperature of 80° C. in the presence of 10 wt % (calculated as the oxide based on alumina) nickel nitrate and 6 wt % (calculated as the oxide based on the alumina) cobalt nitrate. The reaction product is aged at 80° C. for 48 hours. The resulting slurry was washed with hot dilute ammonium hydroxide (pH 8 to 9). FIG. 4 shows the XRD pattern of the QCB formed.

Example 5

A QCB was co-precipitated by co-precipitation of aluminum sulfate and sodium aluminate to a final pH of 10 at a temperature of 80° C. in the presence of 10 wt % (calculated as the oxide based on the alumina) nickel nitrate. The reaction product is aged at a temperature of 80° C. for 48 hours.

Example 6

A QCB was co-precipitated by co-precipitation of aluminum sulfate and sodium aluminate to a final pH of 10 at a temperature of 80° C. in the presence of 8 wt % (calculated as the oxide based on the alumina) cobalt nitrate. The reaction product was aged at a temperature of 80° C. for 48 hours.

Example 7

A QCB was co-precipitated by co-precipitation of aluminum sulfate and sodium aluminate to a final pH of 10 at a temperature of 80° C. in the presence of 5 wt % (calculated as the oxide based on the alumina) molybdenum nitrate. The reaction product was aged at a temperature of 80° C. for 48 hours.

Example 8

A QCB was co-precipitated by co-precipitation of aluminum sulfate and sodium aluminate to a final pH of 10 at a temperature of 80° C. in the presence of 8 wt % cobalt nitrate and 5 wt % (both calculated as the oxides based on the alumina) molybdenum nitrate. The reaction product is aged at a temperature of 80° C. for 48 hours.

Example 9

A QCB was co-precipitated by co-precipitation of aluminum sulfate and sodium aluminate to a final pH of 10 at a temperature of 80° C. in the presence of 9 wt % nickel nitrate, 8 wt % cobalt nitrate, and 6 wt % molybdenum nitrate (all calculated as the oxides based on the alumina). The reaction product is aged at a temperature of 80° C. for 48 hours.

Example 10

CP® alumina (flash-calcined aluminum trihydrate) was treated with 5% (calculated as the oxide) molybdenum nitrate in solution at a temperature of 90° C. for 18 hours, the pH being kept at 7.7. FIG. 5 shows the XRD pattern of the QCB formed.

Example 11

P3® alumina was treated with 10 wt % (calculated as the oxide) gallium nitrate in solution at a temperature of 90° C. for 18 hours, the pH being kept at 6.1. FIG. 6 shows the XRD pattern of the QCB formed.

Example 12

Figure 7:
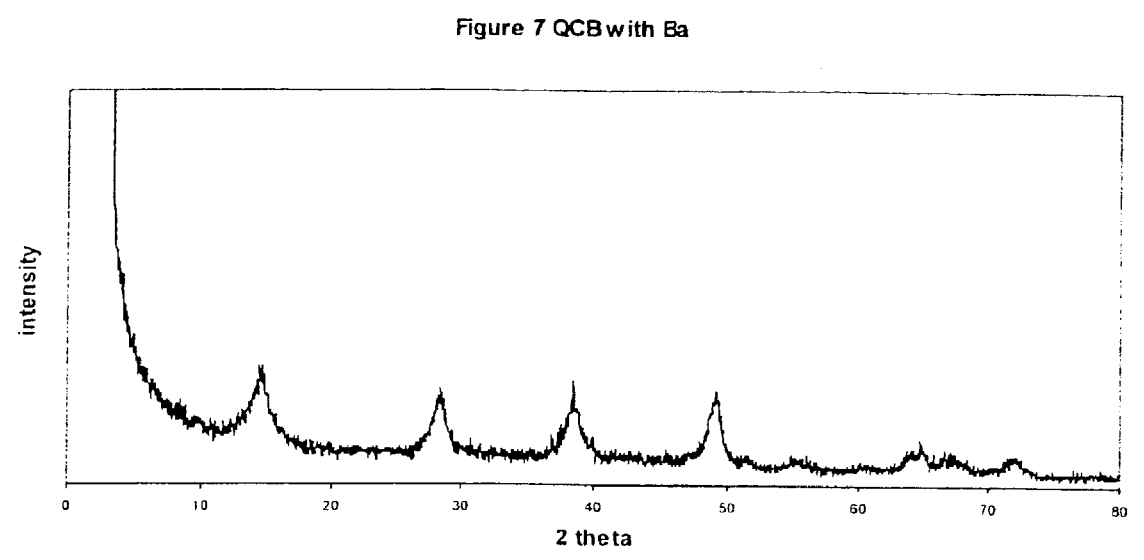

CP® alumina (flash-calcined aluminum trihydrate) was treated with 5 wt % (calculated as the oxide) barium nitrate in solution at a temperature of 100° C. for 18 hours, the pH being 4. FIG. 7 shows the XRD pattern of the QCB formed.

Example 13

Fine ground Gibbsite alumina with average particle of about 3 microns was slurried in water to which quasi-crystalline Boehmite (QCB) treated in a nitric acid solution as added as seeds to form a slurry containing abut 20% solids. The portions of Gibbsite to QCB was about 70% to 30% by weight, respectively, based on the aluminum oxides ($Al_2O_3$). Final slurry was homogenized using a high energy shear mixer while the pH was further adjusted in the range of 4 to 5. Said slurry was aged at 185° C. for 2 hours, product was filtered, washed and dried at 120° C. overnight. XRD analysis indicated product was a QCB-like Alumina.

Example 14

Example 13 was repeated, except that the QCB used as seed was not pretreated with acid, but an ammonium hydroxide solution was added to increase the pH close to 9. Thus, the final slurry was basic. The rest of the processing was the same. Aged product was a MCB type of Alumina based on the XRD analysis

Example 15

Example 13 was repeated except that the nitric acid was replaced with sulfuric acid. The rest of the processing was the same. The product according to XRD analysis was a QCB-like Alumina.

Example 16

Fine ground Gibbsite was dispersed in water solution which contained sodium aluminate in proportions that the total solids were about 20% consisted from 80% of Alumina oxide derived from the Gibbsite and about 20% derived from the sodium Aluminate. Final slurry was homogenized using high energy shear mixing and subsequently divided into two portions:

The first portion was acidified with sulfuric acid to a pH in the range of 4 to 5 and subsequently aged at 185° for 2 hours, filtered, washed and dried. XRD analysis indicated the product was QCB-like Alumina.

The second portion, without acid addition, was aged at 185° C. for 2 hours. Product, according to XRD analysis, was a MCB-like Alumina, and more crystalline than the QCB-like product of the first portion, which was aged in the acidic slurry.

Example 17

Example 16 was repeated except that the sodium aluminate was replaced with an amorphous gel alumina and used in proportions, based on the oxides ($Al_2O_3$), of 70% and 30% of Gibbsite and gel alumina respectively. The rest of the processing was same. The final slurry was divided into two portions. The aged product of the acidified portion was, according to XRD analysis, a QCB-like alumina, whereas the product of the non-acidified portion (aged in a basic slurry) was a MCB-like alumina as determined by XRD analysis.

Example 18

Fine ground Gibbsite having average particle size close to 3 microns was mixed in a slurry with flash calcined Gibbsite having average particle size of about 1.5 microns (Alcoa's Cp 1.5) in portions of about 30% of $Al_2O_3$ derived from the Cp and 70% from the Gibbsite. The slurry was homogenized using a colloidal mill and subsequently divided into three portions.

The first portion was aged at 185° C. for two hours, filtered, washed and dried at 120° overnight. XRD analysis indicated the formation of MCB alumina.

The second portion was acidified with nitric acid to a pH in the range of 4 to 5 while further homogenized and aged as the first portion. The product, according to XRD analysis, was a QCB-like type of alumina.

The third portion was acidified with sulfuric acid to a pH in the range of 4 to 5, and aged as the first portion. XRD analysis indicated the product was a QCB-like type of alumina.

Example 19

A sample of Bauxite oxide concentrate (BOC) was milled to particle sizes in the range of 4 to 5 microns and then calcined at 450° C. for four hours. The calcined material was slurried in water together with Catapal alumina (a commercial QCB) in portions of 70% to 30% by weight based on the oxides, respectively. Said slurry was homogenized with high energy shear mixing, pH was adjusted with sulfuric acid to the range of 4 to 5 and subsequently aged at 185° C. for two hours. XRD analysis indicated the formation of QCB-like alumina product.

Example 20

Flash calcined Gibbsite (Alcoa's Cp 1.5) was slurried in water to make a 20% solids dispersion with high shear mixing. Sulfuric acid was added to decrease the pH in the range of 4 to 5. Slurry was aged at 165° C. for one hour. Slurry was filtered, washed and dried at 120° C. for 18 hours. XRD analysis indicated the product was a QCB-type of alumina.

Example 21

Example 8 was repeated except that instead of adding acid, ammonium hyroxide was added to increase the pH close to 10. Slurry was aged at 195° C. for 2 hours, filtered, washed and dried.

XRD analysis indicated product was a MCB-type of alumina.

Example 22

Example 20 was repeated except that the acid was replaced with 6%. by weight (as $SiO_2$) of an ammonium stabilized silica sol. PH was adjusted close to 10 with the addition of ammonium hydroxide and slurry aged at 165° C. for one hour. Product was filtered, washed and dried. XRD analysis indicated said product was a QCB-type alumina.

Example 23

Flash calcined Gibbsite (Alcoa's Cp 1.5 grade) was slurried in water to form a suspension containing about 18% solids. The slurry was homogenized with a high shear mixer, while a cerium nitrate solution was added sufficient to obtain about 11% cerium as ($Ce_2O_3$) of the Alumina ($Al_2O_3$) content. The pH was adjusted using nitric acid in the range of 4 to 5 and slurry was aged at 185° C. for one hour. Slurry was filtered, and solids washed and dried. XRD analysis indicated product was a QCB-type of alumina, doped with cerium.

Example 24

Example 22 was repeated except that the ammonium stabilized silica sol was replaced with sodium metasilicate, and the pH increased close to 11 using a solution of sodium hydroxide. The slurry was homogenized with high shear mixing and aged at 165° C. for 2 hours. The product was filtered, washed and dried.

XRD analysis indicated that the product was a QCB-type of alumina.

Example 25

Flash calcined Gibbsite (Alcoa's Cp 1.5 grade) was slurried in water to obtain about a 16% solids suspension and homogenized with high shear mixing while the pH was decreased in the range of 6 to 7, using a solution of monoammonium dihydrogen phosphate sufficient to obtain about 2% phosphorus as $P_2O_3$ based on the $Al_2O_3$ content of the slurry. Slurry was aged at 165° C. for one hour, filtered, washed and dried at 120° C. for 18 hours. XRD analysis indicated product was a QCB-type of alumina.

Example 26

Example 25 was repeated except that a solution of tri-ammonium phosphate in place of the monoammonium dihydrogen phosphate was added sufficient to obtain about 2% of $P_2O_3$ based on the $Al_2O_3$ from the Cp. Further, ammonium hydroxide solution was added to increase the pH close to 9. Slurry was homogenized and aged at 185° C. for one hour, and then filtered, washed and dried.

XRD analysis indicated product was a QCB-like of alumina.

Example 27

A slurry containing about 18% Flash calcined Gibbsite (Alcoa's Cp 1.5) was prepared and homogenized using high shear mixing to which a solution of sodium phosphate was added sufficient to obtain about 2% by weight of $P_2O_3$ based on the $Al_2O_3$ from the Cp. Further, sodium hydroxide solution was added to increase the pH in the dose to 10 and aged at 185° C. for one hour.

XRD analysis indicated the formation of a QCB-type alumina.

Example 28

A slurry containing about 15% solids was prepared by dispersing flash calcined Gibbsite (Cp 1.5) in water with high shear mixing. Subsequently, a solution of freshly prepared polysilisic acid was added sufficient to obtain about 4% $SiO_2$ based on the $Al_2O_3$ from the Cp. Followed with the addition of a solution of triammonium phosphate in such portion to obtain about 2% by weight as $P_2O_3$ based on the $Al_2O_3$ content of the slurry. Said slurry was aged at 185° C. for one hour, filtered, washed and dried, and analyzed using XRD, which indicated product was a QCB-type of alumina.

Example 29

A slurry was prepared, by dispersing with high shear mixing about 16% by weight Cp (1.5) flash calcined gibbsite in water to which a sodium silicate solution was added sufficient to obtain about 4% of silica as $SiO_2$ based on the $Al_2O_3$ content from the Cp (1.5).

Further to this slurry while under high shear mixing a sodium phosphate solution was added in portion sufficient to obtain about 3% as $P_2O_3$ by weight, based on the $Al_2O_3$ content of the slurry from the Cp. Subsequently, a solution of sodium hydroxide was added sufficient to increase the pH close to 11. The slurry then was aged at 165° C. for one hour, filtered, and solids washed and dried at 120° C. overnight.

XRD analysis indicated product was a QCB-type of alumina.

Example 30

A slurry containing about 16% solids was prepared by dispersing flash calcined Gibbsite (Alcoa's Cp 3.0) in water with high shear mixing. Further, to this slurry a solution of aluminum Chlorohydrol (ACH) was added sufficient to obtain about 10% by weight as $Al_2O_3$ derived from the ACH based on the $Al_2O_3$ derived from the Cp 3.0. Said slurry was divided into two portions.

The first portion was acidified with nitric acid to a pH of about 3–5 and then aged at 165° C. for 30 and 60 minutes.

The second portion, without the addition of acid, which had a pH in the range of 7 to 8, was aged similarly for 30 and 60 minutes.

All samples were filtered, washed and dried at 120° C. for 18 hours.

XRD analysis indicated the samples of the first portion, which were aged at pH of 3–5, were QCB-types of alumina, but with a lesser crystallinity than the two samples which were aged at pH 7–8.

Example 31

A gelling mixture that was used as an Additive was prepared by mixing alumina chlorohydrol with phosphoric acid in proportions such that the molar ratio of P to AL was close to 1. A portion of this gel-like mixture was added to a water slurry containing 16% by weight of Cp 3.0 while slurry was mixed with a high shear. The amount of this gel used was such that the final slurry contained about 2% by weight of phosphate as $P_2O_3$ based on the total amount of alumina as $Al_2O_3$. The viscous slurry was aged at 185° C. for 30 and 60 minutes, and then filtered, washed and dried.

XRD analysis indicated product was a QCB-type of alumina with low crystallinity.

Example 32

Example 31 was repeated except that the additive of the gel-like mixture was prepared by mixing aluminum chlorohydrol solution with a Sodium Silicate solution in portions such that the final mixture contained silicon and aluminum in molar ratio of about 1.

A portion of the mixture was added to a Cp 3.0 slurry in portions that the % phosphate as $P_2O_3$ based on the total alumina as $Al_2O_3$ was about 3%. Final slurry was homogenized by milling and subsequently aged at 185° C. for one hour. The washed and dried sample was analyzed by XRD, which indicated product was a QCB-type of alumina.

Example 33

An additive with gel-like properties was prepared by mixing a solution of aluminum chlorohydrol with a solution of triammonium phosphate in proportions that the molar ratio of phosphorous to aluminum was close to 1. A portion of this mixture was added to a slurry containing about 15% of Cp 3.0 in portions such that the amount of phosphate as $P_2O_3$ on the total amount of alumina as $Al_2O_3$ was about 3%. Final slurry homogenized with high shear mixing was aged at 185° C. for one hour, filtered and solids washed and dried.

XRD analysis indicated product was a QCB alumina.

Example 34

Example 33 was repeated except that the aluminum chlorohydrol was added separately to the slurry containing the Cp 3.0 first with high shear homogenization and followed with the addition of triammonium phosphate using the same portions of components. Final slurry was aged at 185° C. for one hour.

XRD analysis of the washed and dried product indicated the alumina was a QCB type.

Example 35

A gel-like additive was prepared by repeating Example 33, except that the ammonium phosphate was replaced with sodium pyrophosphate, the portions and conditions were the same. The filtered, washed and dried product, as indicated by XRD analysis, was a QCB-type alumina.

Example 36

A gel-like additive was prepared by mixing a water solution of sodium aluminate with a solution of ammonium phosphate in portions such that the molar ratio of AL to P was about 4 and pH adjusted in the range of 7 to 8 using a solution of nitric acid. A portion of this gel-like additive was dispersed into a slurry which contained 18% Cp 3.0 flash calcined Gibbsite sold by Alcoa. Said slurry contained about 2% of $P_2O_3$ based on the total amount of alumina as $Al_2O_3$, it was homogenized and aged at 185° C. for one hour, subsequently filtered, washed and dried.

XRD analysis indicated product was a QCB-type of alumina.

Example 37

Example 36 was repeated except that the Al—P additive was prepared by mixing solutions of aluminum nitrate, sodium aluminate and phosphoric acid in portions such that the final gel, which was formed by adjusting the pH with nitric acid, had a composition such that the molar ratio of Al to P was about 5.

The rest of the portions and conditions were the same as in Example 36. The product, according to XRD analysis, was a QCB-type of alumina.

Example 38

A gel-like additive was prepared by mixing a solution of aluminum nitrate and a solution of magnesium nitrate with high shear mixing with the addition of a solution of ammonium hydroxide. The final composition of the gel mixture had an Mg to AL molar ratio of about 0.5. A portion of this gel additive was dispersed in water slurry which contained about 14% flash calcined Gibbsite (Alcoa's Cp 1.5 grade) and slurry was further homogenized with high shear mixing. The composition of the final slurry contained about 3% of MgO based on the total amount of alumina as $Al_2O_3$. Subsequently, the slurry containing the Cp and the Mg—Al additive was aged at 165° C. for one hour, filtered, washed and dried. XRD analysis indicated the product was a QCB-type of alumina.

Example 39

Example 38 was repeated except that the Mg to Al molar ratio of the aged gel additive was about 3, the rest of the composition and conditions were the same.

Aged slurry was filtered, and solids washed and dried.

XRD analysis indicated product was a QCB alumina containing a small amount of an anionic clay.

Example 40

A gel-like additive was prepared by dispersing magnesium oxide in water with high shear mixing. To a slurry containing about 16% by weight of flash calcined Gibbsite (CP 3.0), a portion of a gel magnesium oxide additive was added sufficient to obtain a composition having about 2% of MgO based on the amount of $Al_2O_3$ derived from the Cp 3.0. The homogenized slurry was aged at 165° C. for 2 hours, filtered, washed and dried. The product, according to XRD analysis, was a QCB-type of alumina doped with magnesia.

Example 41

A gel-like additive was prepared by mixing solutions of, 13 grams of sodium silicate (about 28% $SiO_2$), 28 grams sodium hydroxide solution (2 molar), and adding 4 grams aluminum nitrate (nine hydrate), 13 grams magnesium nitrate (hexahydrate) and 550 grams of water. The mixture was homogenized and aged at 85° C. overnight to form a Smectite clay. A portion of this aged gel-like additive material was added to a suspension of Cp (3·0) in water containing about 18% solids. The portion of the additive (based on dry materials) was about 4% of the weight of the Cp (3.0). Said slurry containing the gel-like additive and the Cp (3.0) was homogenized by milling and subsequently aged at 185° C. for one hour, filtered, washed and dried. The product, according to XRD analysis, was a QCB-type of alumina.

Example 42

Example 41 was repeated except that the amount of the aged gel-like additive mixed with the Cp (3.0) was increased to about 9%. The rest of the conditions were the same.

XRD analysis indicated that the products after aging at 185° C. for one and two hours were QCB types of alumina doped with Sapomite clay.

Example 43

A gel-like additive was prepared by mixing equal molar amounts of a titanium salt and a zirconium salt and adjusting the pH with ammoniun hydroxide.

A portion of this gel-like additive was mixed with Cp (3.0) in slurry containing 18% Cp (3.0). The amount (on a dry basis) of the gel-like additive used was sufficient to obtain about 6% of $TiO_2$ based on the amount of the Cp (3·0) as $Al_2O_3$ present in the slurry. Final slurry was homogenized using high shear mixing and aged at 185° C. for one hour, filtered, washed and dried.

XRD analysis indicated product was a QCB-type of alumina doped with titania.

Example 44

A slurry was made containing about 21% Cp (3.0) flash alcined Gibbsite to which 8% by weight (based on the weight of the Cp (3.0) of ethylene glycol additive was added with high shear mixing. Slurry was then aged at 165° C. for 30, 60 and 120 minutes. Slurry was filtered, and solids washed and dried. XRD analysis indicated products were QCB-type aluminas with increasing crystallinity with increasing aging time.

Example 45

Example 44 was repeated except that the ethylene glycol additive was replaced with the same amount of sugar. The rest of the conditions were the same. According to XRD analysis, the QCB products were similar to those obtained in Example 32.

Example 46

Example 44 was repeated except that the ethylene glycol was replaced with 6% by weight of tetrabutyl guaternary ammonium hydroxide surfactant using the same conditions.

Products, according to XRD analysis, were QCB-type of aluminas.

Example 47

Example 44 was repeated except that the ethylene glycol was replaced with 4% by weight of a gellant organo-clay (Bentone) which is used commercially in the paint industry as gellant. The rest of the conditions were the same.

Products, according to XRD analysis, were QCB-type alumina doped with the Bentone clay.

Example 48

Example 44 was repeated except that the ethylene glycol additive was replaced with the same weight of a soluble organic polymer. The rest of the conditions were the same.

Products, according to XRD analysis, were QCB-type of aumina.

Example 49

A gel-like additive was prepared by mixing, 3 parts by weight of sodium silicate (containing about 30% $SiO_2$), 1 part sodium pyrophosphate, and 1 part of carbon black powder (grade, black pearl having average particle size of 130 A°; 300 sold by Cabot Corp.) and ingredients milled. To a slurry of Cp (3.0) in water containing 22% solids, about 10% by weight, based on the dry weight of the Cp (3.1) in the slurry, of the above prepared gel-like additive was added and final slurry homogenized by milling. Final slurry was aged at 185° C. for 30, 60, and 120 minutes. Slurry was filtered and solids washed dried. XRD analysis indicated the formation of QCB type of Alumina, with increasing crystallinity as the aging time was increased.

Example 50

Example 49 was repeated except that the carbon black component in the gel-like additive was replaced with the same weight of a fine ground natural Smectite-Sodium Bentonite mined in Wyoming. The rest of compositions and process conditions were the same. XRD analysis indicated the formation of QCB type aluminas with increasing crystallinity at the longer aging periods.

Example 51

Example 30 was repeated with the exception that 6% of cerium nitrate (as $Ce_2O_3$) was added to the slurries before aging. Rest of the processing was the same. The washed and dried products were analyzed by XRD which indicated the formation of QCB types of aluminas.

Example 52

Example 36 was repeated except that to the final slurry containing the flash calcined Gibbsite (Cp 3.0) before aging, 3% by weight, based on the total weight of alumina as ($Al_2O_3$) of ammonium vanadate was added, and slurry further homogenized by milling. Rest of the processing was the same. The washed and dried product, according to XRD analysis, was a QCB type Alumina.

Example 53

Example 29 was repeated except that to the final slurry before aging while homogenized with shear mixing, 8% by weight of ammonium heptamolybdate as $Mo_2O_3$ was added based on the dry weight of the Cp Alumina present in the slurry. The rest of the processing was the same. The washed and dried product was identified by XRD to be a QCB type of alumina.

Example 54

Example 29 was repeated except that in the final slurry before aging, 4% by weight of ammonium tungstate was added based on the weight of the Alumina in the slurry (as $Al_2O_3$). The rest of the processing was the same. The product, according to XRD analysis, was a QCB type of alumina doped with tungsten.

Example 55

In the following examples, mixtures of Gibsite or BOC with flash calcined Gibbsite or flash calcined BOC were used to prepare samples of QCB products as such or doped with metals. Flash calcined Gibbsite was used to function as a seeding material and/or as part of the total alumina feed which in either case was converted to QCB alumina product. In the mixtures containing the Gibbsite or BOC or flash calcined Gibbsite, the relative weight of the individual components were based on the $Al_2O_3$ alumina content.

Example 56

Example 3 was repeated except that 75% of the weight of the flash calcined Gibbsite used (as 1.5 grade) was replaced with a fine particle Gibbsite. The amount of sodium silicate used was about 3% as $SiO_2$ based on the total A alumina as $Al_2O_3$. The slurry was homogenized using high shear mixing and subsequently aged at 185° C. for one hour and two hours. Slurries were filtered and solids washed and dried. XRD analysis indicated the products to be QCB aluminas.

Example 57

Example 56 was repeated except that a sodium hydroxide solution was added to the slurry before aging to increase the pH close to 10. The rest of the processing was the same. XRD analysis indicated that the products were a QCB type of alumina.

Example 58

Gibbsite and CP alumina® (RATIO 70:30 by weight) was treated along with 5 wt % (based on the $Al_2O_3$) of sodium phosphate in solution (calculated as $P_2O_3$). The pH was raised close to 10 by addition of sodium hydroxide. The mixture was aged for 1 hour at a temperature of 200° C. in an autoclave. XRD analysis of the washed and dried product indicated it to be a QCB type of alumina.

Example 59

A mixture of Gibbsite, CP alumina, in the ratio by weight of 70/30, respectively, and 2 wt % (based on the $Al_2O_3$) of sodium pyrophosphate in solution (calculated as $P_2O_3$) were treated at a pH of 4 with the addition of nitric acid for two hours in an autoclave at 220° C. XRD analysis of the washed and dried product indicated it to be a QCB type of alumina.

Example 60

Examples 59 and Example 56 were combined as follows. A mixture containing Gibbsite and Cp (1.5) in 70/30 by weight portions, respectively, was slurried in water to obtain a dispersion containing about 20% solids. The slurry was homogenized using a high-energy input high shear mixer. To the slurry, sodium silicate was added sufficient to obtain about 3% ($SiO_2$) based on the total weight of alumina as $Al_2O_3$. Additionally, a solution of sodium pyrophosphate was added sufficient to obtain about 2% as $P_2O_3$ based on the total weight of alumina as $Al_2O_3$. The slurry containing all ingredients was further homogenized and aged at 200° C. for one and two hours. The slurry was filtered and the solids washed and dried. XRD analysis indicated products were a QCB type alumina.

Example 61

Example 60 was repeated except that the sodium pyrophosphate was replaced with triammonium phosphate. Rest of compositions and process conditions were the same. The products, according to XRD analysis, were QCB type of alumina.

Example 62

Example 33 was repeated except that 75% by weight of the Cp was replaced with Gibbsite based on $Al_2O_3$ contents. Further, the slurry containing all the Alumina and the gel-like additive were homogenized by milling. The rest of the processing conditions were the same. The product after washing and drying was identified by XRD analysis to be a QCB type of Alumina.

Example 63

Example 36 was repeated except that about one-half of the weight of Cp (3.0) was replaced with a fine ground BOC. The final slurry was homogenized by milling. The rest of the processing was the same. The product as indicated by XRD analysis was a QCB type of alumina.

Example 64

Example 39 was repeated except that 75% of the weight of the Cp alumina was replaced with fine ground BOC alumina, using the weights of the $Al_2O_3$ oxides, respectively. The rest of the processing was the same. The product according to XRD analysis was a QCB type of alumina doped with anionic clay.

Example 65

Example 42 was repeated except that ½ of the weight of Cp (3.0) was replaced with fine ground BOC alumina based on the weights as $Al_2O_3$ for both types of alumina. Final slurry was homogenized with milling. The rest of the processing was the same. The washed and dried product, according to XRD analysis, was a QCB type of alumina doped with Smectite clay.

Example 66

A gel-like additive was prepared by mixing under high shear ammonium stabilized polysilisic acid with fine ground Wyoming Bentonite in portions such that the $SiO_2$ from the polysilisic acid was about equal to the dry weight of the Bentonite clay.

Another slurry was prepared by dispersing a mixture of Gibbsite and Cp (1.5) in proportions of, ⅔ by weight (as $Al_2O_3$) of Gibbsite to, ⅓ of Cp (1. 5)as $Al_2O_3$. The slurry contained about 18% solids. To this slurry a portion of the gel-like additive was added sufficient to obtain about 3% $SiO_2$ coming from the polysilisic acid and based on the total amount of alumina (as $Al_2O_3$) of the second slurry.

The final slurry was homogenized using a high-energy input shear mixer and aged at 185° C. for two hours. The slurry was filtered and solids washed and dried. XRD analysis indicated product was QCB Alumina doped with Clay.

Example 67

A gel-like additive was prepared by mixing sodium silicate (about 30% $SiO_2$) solution with a fine particle carbon black (130 A°) in portions of ⅔ by weight of silicate (as $SiO_2$) to ⅓ by weight of carbon black powder. Said additive was homogenized using a high-energy shear mixer.

Another slurry was prepared containing about 20% solids using a mixture of BOC (trihydrate alumina) which was ground to fine particles and Cp (1.5) Flash calcined Gibbsite in portion of 75% BOC and 25% Cp (1·5) based on the $Al_2O_3$ weights for both types of alumina.

To the alumina containing slurry, a portion of the gel-like additive was added sufficient to obtain about 4% silica (as $SiO_2$) based on the weight as $Al_2O_3$ of the total alumina.

The final slurry was homogenized using a high-energy input shear blender, and subsequently aged at 185° C. for two hours. The aged slurry was filtered and solids washed and dried at 120° C. overnight. The product, according to XRD analysis, was a QCB type of alumina doped with silica and carbon.

Example 68

Example 56 was repeated except that in the slurry before aging a solution of ammonium heptamolybdate was added sufficient to obtain about 6% molybdate (as the oxide) based on the total amount of alumina as $Al_2O_3$. The product, according to XRD analysis, was a QCB type of alumina.

Example 69

Example 68 was repeated except that the ammonium heptamolybdate was replaced with a solution of ammonium tungstate sufficient to product about 2% by weight of tungsten oxide as the total alumina based on the $Al_2O_3$. The product, according to XRD analysis, was a QCB alumina.

Example 70

A slurry containing about 18% solids was prepared using a mixture of Gibbsite and Cp (3.0) alumina in the ratio of 75% to 25% by weight as $Al_2O_3$, respectively, and homogenized with high shear mixing. Subsequently, a portion of the solution of sodium pyrophosphate was added sufficient to yield about 2% of phosphate as $P_2O_3$ on the total amount of alumina as $Al_2O_3$. Further, a solution of cobalt nitrate was added sufficient to obtain about 6% by weight as cobalt oxide on the final product based on the $Al_2O_3$ content. Final slurry was homogenized by milling and aged at 185° C. for one and two hours. The slurries were filtered and the solids washed and dried. The rest of the processing was the same. The products, according to XRD analysis, were QCB type of aluminas.

Example 71

Example 60, was repeated except that a nickel nitrate solution was added sufficient to obtain about 6% nickel as nickel oxide on the final product based on the total amount of alumina as $Al_2O_3$. The rest of the processing was the same. The products according to XRD analysis were QCB type aluminas.

Example 72

Example 65 was repeated except, to the final slurry before aging a solution of ammonium vanadate was added sufficient to obtain about 2% by weight vanadia (as vanadium oxide) on the final dried product. XRD analysis of the washed and dried products indicated that they were QCB type of alumina doped with Smectite clay.

Example 73

A gel-like additive was prepared by mixing Cp (1.5) flash calcined alumina with magnesium oxide at the molar ratio of about 3 Mg to 1 Al in water slurry containing about 15% solids and aged at 85° C. for 8 hours. A second slurry was prepared by mixing fine ground Gibbsite and Cp (1.5) flash calcined alumina in the ratio of 3 to 1 as $Al_2O_3$, respectively. A portion of the gel-like additive containing the magnesia was added to the second slurry containing the Gibbsite and Cp (1.5) alumina, sufficient to obtain about 3% of MgO on the final dried product based on the $Al_2O_3$ content.

The final slurry was milled in order to be homogenized and subsequently aged at 185° C. for two hours. The slurry was filtered and the solids washed and dried. XRD analysis indicated product was a QCB type of alumina doped with anionic clay.

Example 74

Example 73 was repeated except that before aging a solution of cerium nitrate and a solution of ammonium vanadate were added sufficient to obtain about 8% by weight of cerium as cerium oxide and 4% by weight of vanadium as vanadium oxide on the final product based on the $Al_2O_3$ content. The rest of the processing was the same. XRD analysis indicated the products were Alumina doped with anionic clay.

Example 75

A gel-like additive was prepared by mixing in water sodium slicate, carbon black (130 A°), and sodium pyrophosphate in such proportion that the mixture contained equal weight amounts of $SiO_2$, carbon, and phosphorous (as $P_2O_3$). Said mixture was homogenized with high shear mixing.

Further, a slurry was prepared containing ⅔ by weight as $Al_2O_3$ from BOC (alumina trihydrate) and ⅓ from Cp (3.0) flash calcined Gibbsite. Such slurry contained about 18% solids.

A portion of the gel-like additive was added to the slurry containing the BOC and Cp (3.0), sufficient to obtain on the final product as $Al_2O_3$ about 3% silica as $SiO_2$. Further to this slurry before aging a solution of cobalt nitrate and a solution of ammonium heptamolybdate were added sufficient to obtain on the final alumina oxide product about 4% cobalt oxide and 7% by weight of molybdenum oxide. The final slurry was homogenized by milling in a high-energy impact mill and aged at 185° C. for two hours and washed and dried. The product, according to XRD analysis, was a QCB type of alumina.

Example 76

Preparation A: Flash calcined Gibbsite alumina (Cp (1.5) was dispersed in water to obtain about a 20% solids containing slurry and adding sufficient acetic acid to lower the pH in the range of 6–7, and while using high shear mixing a solution of cerium acetate was added to the slurry sufficient to obtain about 12% $Ce_2O_3$ by weight based on the $Al_2O_3$ from the Cp. Said slurry was aged for 16 hours at 130° C. and formed a low crystallinity QCB doped with cerium. To this slurry, fine particle Gibbsite was added sufficient to obtain a mixture, of the starting Cp (1.5) and the Gibbsite, containing about 30% by weight CP (1.5) and 70% Gibbsite, with further addition of water to maintain the % solids in the slurry about 18%. Final slurry was homogenized with a high energy input mill.

Preparation B: Preparation A was repeated except that the cerium acetate and acetic acid were replaced with sodium silicate, which was added sufficient to obtain about 6% by weight as $SiO_2$ based on the $Al_2O_3$ from the Cp (1.5) alumina.

Slurry was aged at 130° C. for 16 hours to form a QCB doped with silica. Said slurry was mixed with find-particle Gibbsite in portions by weights of about 30% of the CP (1.5) with 70% of Gibbsite, diluted with water to about 18% total solids and homogenized by milling.

Preparation C: Preparation B was repeated except that the sodium silicate was replaced with 5% by weight (as $P_2O_3$) of sodium pyrophosphate. The rest of the preparation was same.

The aged slurry at 130° C. for 18 hours contained a low crystallinity QCB alumina doped with phosphorous, which subsequently was mixed with the Gibbsite, in proportions as in preparation B above, and homogenized by milling the total slurry.

Preparation A, which contained the cerium doped QCB and the Gibbsite in a milled slurry, was divided into three portions: A1, A2, A3.

To portion A1, a sodium silicate solution was added sufficient to obtain about 3% of $SiO_2$ based on the total of alumina as $Al_2O_3$. The slurry was further homogenized using a high shear mixer; and aged at 185° C. for two hours.

To portion A2, a sodium pyrophosphate solution was added sufficient to obtain about 2% of $P_2O_3$ by weight based on the total amount of alumina as $Al_2O_3$, and aged at 185° C. for two hours.

To portion A3, a solution of sodium silicate and a solution of sodium pyrophosphate were added so that the final alumina product contained about 2–3% $SiO_2$ and 1–2% of $P_2O_3$ by weight based on the weight of alumina as $Al_2O_3$. Homogenized slurry was aged at 185° C. for two hours.

The aged slurries from portions A1, A2, A3 were filtered, solids washed and dried at 120° C. for 16 hours. XRD analysis indicated that doped QCB type of alumina were formed in all the three samples with similar crystallinities.

Preparation B, which contained the silicon doped-QCB and the Gibbsite in a milled slurry, was divided into three portions: B1, B2 and B3.

The samples of these three portions were treated in the same manner as samples of portions A1, A2 and A3 above by adding to them the same amounts of silicate, phosphate and silicate plus phosphate and aged in the same manner. XRD analysis of the aged, washed and dried samples indicated the formation of doped-QCB type of aluminas similar to samples A1, A2 and A3 above.

Preparation C, which contained the phosphorous-doped QCB and the Gibbsite in the milled slurry, was divided into three portions: C1, C2 and C3. The samples of these three portions were treated in the same manner as samples B1, B2 and B3 above, by adding to them the same amounts of sodium silicate, sodium pyrophosphate and sodium silicate plus sodium pyrophosphate and aged as samples A1, A2, A3 and B1, B2 and B3.

XRD analysis indicated that all three samples, C1, C2 and C3, contained doped QCB type of alumina with similar crystallinities.

Example 77

A slurry was prepared containing about 16% solids of Cp (3·0), flash calcined Gibbsite, (as $Al_2O_3$), to which 3% by weight (as $SiO_2$) of sodium silicate was added while slurry was homogenized with high shear mixing and aged at 120° C. for two hours. Subsequently, the pH was adjusted with nitric acid close to 7 and slurry milled for further homogenization and further aged at 165° C. for one hour. Aged slurry was filtered, and solids washed and dried at 120° C. for 16 hours. XRD analysis indicated product was a QCB type of alumina.

Example 78

A slurry containing about 16% by weight of Cp (3·0) as $Al_2O_3$ was prepared and the pH adjusted using nitric acid close to 4 and was mixed using a high shear mixer and aged at 165° C. for one hour. Subsequently, said slurry was milled using a high energy input colloidal mill and aged for a second time at 185° C. for one hour. The slurry was filtered, and solids washed and dried. XRD analysis indicated product was a QCB type of alumina.

Example 79

Example 78 was repeated except that to the starting Cp (3.0) slurry, 3% by weight of carbon black powder was added. The rest of the processing was the same. The product, according to XRD analysis, was a QCB type of alumina.

Example 80

A slurry containing about 18% Cp (3.0) by weight (as $Al_2O_3$) was prepared with homogenizing with high shear mixing to which about 2% by weight (as $SiO_2$) of sodium silicate was added and slurry aged at 165° C. for 30 minutes. Subsequently, the slurry was milled with the addition of about 2% of sodium phosphate, and further aged at 165° C. for one hour. The slurry was filtered, and the solids washed and dried. The product, according to XRD analysis, was a QCB type of alumina.

Example 81

A slurry containing about 20% by weight of Cp (3.0) as $Al_2O_3$ was prepared using high shear mixing and aged for 6 hours at ambient temperature at a pH of about 10 adjusted by using a sodium hydroxide solution. Subsequently, slurry was milled while 3% by weight (as $SiO_2$) of sodium silicate and 2% of sodium pyrophosphate (as $P_2O_5$) were added based on the Cp (3.0) as $Al_2O_3$. Milled slurry was further aged at 165° C. for one hour. The washed and dried product was a QCB type of alumina.

Example 82

A slurry containing Cp (1.5) flash calcined Gibbsite with 20% by weight of solids was aged at 85° C. for six hours in a pH of about 10 adjusted using sodium hydroxide, while under high shear mixing, and subsequently slurry was milled while 2% of sodium pyrophosphate (as $P_2O_5$) and 4% by weight of a Smectite Saponite clay were added and further aged at 185° C. for two hours. The slurry was filtered, and solids washed and dried. XRD analysis indicated product was a QCB type of alumina doped with clay.

Example 83

Example 82 was repeated except that the Smectite Saponite was replaced with 2% by weight of carbon black powder. The rest of the processing was the same. The product, according to XRD analysis, was a QCB type of alumina.

Example 84

Example 82 was repeated except that about 75% by weight (as $Al_2O_3$) of the Cp (1·5) was replaced with a fine ground Gibbsite. The rest of the processing was the same. The product, according to XRD analysis, was a QCB type of alumina.

Example 85

A gel-like additive was prepared by mixing a solution of sodium silicate with a solution of sodium pyrophosphate using equal weight portions as $SiO_2$ and $P_2O_5$ in the mixture. A portion of this gel-like additive was added to Cp (1.5) powder sufficient to produce about 2% of $SiO_2$ and 2% of $P_2O_5$ on the dry weight of the Cp (1.5) alumina. Additionally, a sodium hydroxide solution was added to the mix, sufficient to produce a paste, which was kneaded and extruded into pellets, which were subsequently steamed for two hours. XRD analysis indicated that the extrudates were QCB-like Alumina. Subsequently, extrudates were calcined for 2 hours at 650° C. and washed with a solution of ammonium hydroxide and dried.

Example 86

A mixture of Cp (1.5) containing about 10% cobalt oxide and 6% molybdenum oxide based on the $Al_2O_3$ was prepared by mixing with a solution of cobalt nitrate and a solution of ammonium molybdate with the addition of about 2% of ammonium phosphate. The wet cake formed with mixing was kneaded, extruded, and pellets steamed for two hours. The product, according to XRD analysis, was a QCB type of alumina. Subsequently, it was calcined at 650° C. for four hours to form transition alumina doped with cobalt, molybdenum, and phosphorous.

Example 87

Cp(1.5) was peptized with nitric acid at 85° C. for 8 hours in a slurry containing 22% solids at a pH of about 4.

Subsequently, a solution of sodium metasilicate was added to increase the pH and to obtain about 3% of $SiO_2$ based on the $Al_2O_3$. Slurry was then aged at 160° C. for two hours, filtered, washed and dried. The product, according to XRD analysis, was a quasi-crystalline boehmite which, according to chemical analysis, contained silica.

Example 88

Example 87 was repeated except the flash calcined gibbsite (Cp 1.5) was peptized with acetic acid. The rest of the process was the same. XRD analysis indicated the formation of a QCB.

Example 89

Flash calcined gibbsite (Cp 1.5) was peptized with nitric acid at a pH of about 3 at 85° C. for 8 hours.

Subsequently, ammonium hydroxide was added to bring the pH close to 7, followed with the addition of 2% by dry weight of a synthetic laponite clay. Sand slurry was homogenized by milling and aged at 165° C. for two hours.

Example 90

Gibbsite alumina was peptized with nitric acid at a pH of about 3 in an autoclave at 195° C. for four hours using a slurry which contained about 18% solids.

Subsequently, a sodium hydroxide solution was added to the slurry to raise the pH close to 7 and to which slurry a solution of sodium phosphate was added, sufficient to obtain about 2% of $P_2O_3$ on the $Al_2O_3$. Said slurry was hydrothermally treated at 85° C. for four hours, filtered, washed and dried.

The product, according to XRD analysis, was a quasi-crystalline boehmite. Chemical analysis confirmed the presence of phosphorous in the boehmite.

Example 91

Example 90 was repeated except that the sodium phosphate was replaced with a solution of magnesium nitrate, sufficient to obtain about 4% of MgO on the $Al_2O_3$.

The rest of the process was the same. XRD analysis indicated the formation of a QCB which was determined to be doped with magnesium.

Example 92

Flash calcined gibbsite(Alcoa's Cp3) was peptized with formic acid in a slurry containing about 16% solids, and aged at ambient temperature overnight.

Subsequently, a solution of zinc acetate was added, sufficient to yield about 4% of ZnO on the $Al_2O_3$ basis. Slurry was milled and aged at 165° C. for 2 hours, then filtered, washed and dried.

XRD analysis indicated the formation of a quasi-crystalline boehmite.

Example 93

Example 92 was repeated except that after the Cp(3) was peptized with acetic acid, ammonium hydroxide was added to increase the pH close to 8 and then followed with the addition of the zinc acetate solution. The rest of the processing was the same.

Example 94

Flash calcined gibbsite (Alcoa's Cp 1.5) was dispersed in water slurry containing 20% solids and aged at ambient temperature for 8 hours. Subsequently, 2% by weight of sodium gluconate was added based on the weight of $Al_2O_3$ together with 3% by weight of magnesium acetate. The slurry was milled and aged at 165° C. for one hour, filtered, washed and dried.

Analysis of the product by XRD indicated the formation of quasi-crystalline boehmite.

Example 95

Flash calcined gibbsite (Alcoa's CP 1.5) was peptized with formic acid at ambient temperature for 6 hours in a slurry containing 23% solids.

Subsequently, the pH was increased close to 7 with the addition of ammonium hydroxide and 4% of synthetic laponite clay was added while the whole slurry was milled in a colloidal mill and aged at 165° C. for one hour. The product, according to XRD analysis, was a low crystallinity quasi-crystalline boehmite.

In a second experiment, a portion of this aged at 165° C. slurry, containing the low crystalline quasi-crystalline boehmite was further treated at 185° C. for one hour after 3% of lanthanum nitrate was added. Sample was filtered, washed and dried.

XRD analysis indicated the product was a quasi-crystalline boehmite with increased crystallinity as compared to the sample without the lanthanum salt.

Example 96

Flash calcined gibbsite (Alcoa's Cp 1.5) was treated in a slurry containing about 18% solids and about 2% glycolic acid at 65° C. for 8 hours. Subsequently, 2.5% by weight of synthetic laponite clay was added and the slurry milled. Said milled slurry was divided into 3 portions (A, B and C).

Portion A was aged at 165° for two hours, filtered, washed and dried.

Portion B, to which as added 3% of cerium acetate (as $C_2O_3$) was also aged at 165° C. for two hours, filtered, washed and dried.

Portion C, to which was added 3% of vanadyl sulphate (As $V_2O_5$) was also aged at 165° for 2 hours, filtered, washed and dried.

Portions A, B and C were analyzed by XRD, which indicated all three samples consisted of quasi-crystalline boehmite with some variations in the amount of crystallinity and crystal size.

Example 97

Example 96 was repeated except that the Cp (1.5) alumina was treated in water without the addition of glycolic acid. The rest of the conditions and processing were the same.

Samples A, B and C all produced quasi-crystalline boehmite.

Example 98

Example 97 was repeated except that to the slurry which was aged at 165° C. for 2 hours, besides the 2.5% of laponite clay, also 2% of sodium gluconate was added. The rest of the compositions and processing were the same.

Samples A, B and C, when analyzed by XRD, indicated the products were quasi-crystalline boehmites with some variations in the amount of crystallinity and crystal size.

Example 99

Flash calcined gibbsite (Alcoa's CP 1.5) was slurried in water to which 4% (as $SiO_2$) by weight based on the $Al_2O_3$ of an ammonium. Stabilized silica sol was added and the slurry homogenized using a high shear mixer. Said slurry was divided into 3 samples: A, B and C.

Sample A was aged at 150° C. for 2 hours.

To Sample B, 2% ammonium phosphate was added and aged at 150° for 2 hours.

To Sample C, 2% of synthetic montmorillonite was added, high shear mixed and aged at 150° for 2 hours.

All the samples were filtered, washed and dried at 120° C. overnight. XRD analysis indicated all three samples consisted of quasi-crystalline boehmite.

Example 100

Flash calcined gibbsite (Alcoa's grade Cp 1.5) was digested in water at ambient temperature for 8 hours in a slurry containing 23% solids, and while the slurry was being mixed with high shear, 2.8% by weight as $P_2O_3$ of sodium pyrophosphate was added from a solution based on the weight $Al_2O_3$. Subsequently, said slurry was aged at 165° C. for 2 hours. The product was filtered, washed and dried.

XRD analysis indicated the product was a quasi-crystalline boehmite and, according to chemical analysis, it was doped with phosphorous.

Example 101

Example (100) was repeated except that besides the sodium pyrophosphate; additionally 3.5% by weight of sodium silicate was added based on $SiO_2$ and $Al_2O_3$ contents. Subsequently, the slurry was processed the same.

The product, according to XRD analysis, was a quasi-crystalline boehmite which was chemically determined to contain silicon and phosphorous.

Example 102

Example 100 was repeated except that the sodium pyrophosphate was replaced with 2% synthetic laponite clay and the slurry milled in a colloidal mill. The rest of the processing was the same.

Analysis by XRD indicated the product was a quasi-crystalline boehmite, doped with the synthetic clay.

Example 103

Example 100 was repeated except that besides the sodium pyrophosphate, 3% by weight based on the $Al_2O_3$ of synthetic laponite clay was dispersed in the slurry, which was milled and subsequently aged at 165° for two hours. The rest of the processing was the same.

XRD and chemical analyses indicated the product was a quasi-crystalline boehmite doped with phosphorous and synthetic clay.

Example 104

Example 100 was repeated except a mixture containing synthetic laponite clay and polysilisic acid was added while said slurry was mixed with high shear. Based on the $Al_2O_3$ content of the slurry, the amounts of laponite and polysilisic acids added were about 2.0% and 2.6%, respectively. The rest of the processing was the same.

XRD analysis and elemental chemical determinations indicated the product was a quasi-crystalline boehmite doped with silicon and synthetic laponite clay.

Example 105

Example 100 was repeated except to the slurry containing the flash calcined gibbsite while being mixed, about 2% by weight of sodium silicate (as $SiO_2$) 1.5% by weight of sodium pyrophosphate as $P_2O_3$ and 3.8% by weight of synthetic laponite clay were added, and the slurry was subsequently milled, and three samples separately aged at 165° C. for 1, 2 and 4 hours.

The samples were filtered, washed and dried. Chemical analysis and XRD indicated all three products were quasi-crystalline boehmites, with increasing crystallinity and crystal size as the aging time was increased, with the four-hour aged sample being the most crystalline and having the largest crystal size and smallest surface area and pore volume.

Chemical analysis indicated all three quasi-crystalline boehmites were doped with silicon, phosphorous and synthetic clay.

Example 106

Example 105 was repeated except that part of the Cp (1.5) was replaced with BOC (fine ground to about 3 microns) in portions of 30 parts by weight Cp 1.5 and 70 parts by weight of gibbsite, while the slurry containing the two types of alumina was being milled, 2.0% by weight sodium pyrophosphate (as $P_2O_3$) and 3.8% by weight of bentonite clay were added, followed with further milling.

Subsequently milled slurry was aged at 195° C. for two hours, filtered, washed and dried.

XRD and chemical analysis indicated the product was a quasi-crystalline boehmite doped with silicon, phosphorous and synthetic clay.

Example 107

A mixture of Gibbsite and Flash Calcined Gibbsite (Alcoa's Cp3.0) in proportion of 75 to 25% by weight (as $Al_2O_3$) respectively was prepared and slurried in water sufficient to obtain a slurry containing about 18% solids. The slurry was homogenized by milling. While the slurry was being homogenized, a solution of nitric acid was added to lower the pH in the range of 2 to 3, and a solution of zinc nitrate was added sufficient to obtain about 4% of ZnO on the total alumina (based on $Al_2O_3$). Subsequently, the pH was raised close to 5 with the addition of a solution of ammonium hydroxide and the slurry aged at 185° C. for two hours and filtered, washed and dried at 125° C. for 18 hours. XRD analysis indicated the product was a QCB alumina, which according to chemical analysis contained zinc.

Example 108

Example 107 was repeated except that the dopant zinc nitrate was replaced with a solution of cerium nitrate which was added sufficient to obtain about 11% of $Ce_2O_3$ on the final alumina product (based on $Al_2O_3$). XRD and chemical analysis indicated product was a QCB alumina doped with cerium.

Example 109

Example 107 was repeated except that the zinc nitrate was replaced with a solution of ammonium tungstate sufficient to obtain about 3% of tungstate oxide on the final product. The rest of the processing was the same. Analysis of the product indicated it to be a QCB doped with tungsten.

Example 110

Flash calcined gibbsite (Alcoa's Cp3.0 grade) was slurried in water sufficient to give about 22% solids. The slurry was homogenized with a high shear mixer. The pH was lowered in the range of about 4 to 5 with the addition of a solution of aluminum sulphate. Subsequently, a solution of vanadyl sulphate was added sufficient to obtain about 3% of vanadium as $V_2O_5$ on the final alumina product based on $Al_2O_3$. Said slurry was further homogenized while the pH was raised close to 7 with the addition of a solution of ammonium hydroxide, and subsequently, slurry was aged at 165° C. for two hours.

XRD and chemical analysis indicated product was a QCB alumina doped with vanadium.

Example 111

A highly concentrated solids containing slurry was prepared by mixing a solution of nitric acid with flash calcined gibbsite (Alcoa's Cp3.O grade), wherein sufficient aluminum nitrate was used to lower the pH of the slurry close to 4. Further solutions of nickel and cobalt nitrates were added in proportions so that the final alumina product contained about 12% nickel oxide and 8% of cobalt oxide, based on the total $Al_2O_3$ of the product. During all of the above additions, the slurry was being homogenized. While the slurry was further homogenized, ammonium hydroxide solution was added to raise the pH close to 8 and water evaporated to increase the solids sufficiently to form extrudable cake, which was subsequently palletized. The pellets were dried and calcined at 450° C. for two hours, placed in water solution of ammonium hydroxide with the pH being adjusted close to 8 and aged at 95° C. for 18 hours, dried and recalcined. Analysis of the pellets indicted the presence of a QCB-type alumina doped with nickel and cobalt metal oxides. Subsequently, these extrudates were used as a hydroprocessing catalyst, pretreated in the standard manner (with hydrogen reduction and sulphiding) and tested for HDS and HDN activities.

The invention claimed is:

1. A composition comprising quasi-crystalline boehmite and an additive present in a homogeneously dispersed state, said additive being selected from the group consisting of alkaline earth metals, transition metals, actinides, noble metals, gallium, boron, phosphorus, silicon, metal oxides, hydroxides, mixed oxides, clays, zeolites, spinels, perovskites, organic and inorganic acids and salts and mixtures thereof, and said quasi-crystalline boehmite having a peak width at half length of the maximum intensity of the (020) XRD reflection of 1.5 or greater than 1.5 degrees 2-theta.

2. The composition of claim 1 wherein said organic acids and salts thereof are selected from the group consisting of formic acid, acetic acid, citric acid, oxalic acid, gluconic acid, propionic acid and salts thereof.

3. The composition of claim 1 wherein said inorganic acids and salts thereof are selected from the group consisting of hydrochloric acid, nitric acid, sulfuric acid, chromic acid, phosphoric acid, silicic acid, aluminum nitrate, sulfate salts, chloride salts, ammonium nitrate, ammonium phosphate, phosphorous containing salts, borates, tungstates and mixtures thereof.

4. The composition of claim 1 wherein a rare earth metal-containing compound is also present.

5. The composition of claim 1 that is embedded in a binder or matrix material, or both.

6. The composition of claim 5 comprising small pore zeolite of the pentasil-type.

7. The composition of claim 6 comprising pentasil-type zeolite selected from the group consisting of ZSM, Beta, Sapo and Alpo.

8. The composition of claim 5 comprising faujasite-type zeolite.

9. The composition of claim 8 comprising faujasite-type zeolite selected from the group consisting of NaX, NaY, and their ion exchanged and stabilized forms.

10. The composition of claim 5 comprising large-pore mesoporous-type zeolite.

11. The composition of claim 10 comprising large-pore mesoporous-type zeolite selected from the group consisting of MCM-41, VIP-5, ITQ-21, and their ion exchanged and stabilized forms.

12. The composition of claim 10 wherein said large-pore mesoporous-type zeolite is impregnated with an aqueous solution of one or more salts of rare earth and/or transition metals.

13. The composition of claim 5 wherein said binder or matrix material comprises extenders, fillers and catalyst support material.

14. A process for the preparation of the quasi-crystalline boehmite of claim 1 wherein a quasi-crystalline boehmite precursor and an additive are converted to a quasi-crystalline boehmite containing an additive in a homogeneously dispersed state.

15. The process of claim 14 wherein one or more of the ingredients of the precursor have been doped with metal additives.

16. The process of claim 14 wherein the quasi-crystalline boehmite precursor and additive are aged to form a quasi crystalline boehmite containing an additive in a homogeneously dispersed state.

17. The process of claim 14 wherein said quasi-crystalline boehmite precursor is first aged in the presence of additives comprising acids or bases.

18. The process of claim 14 wherein more than one type of quasi-crystalline boehmite precursor is used.

19. The process of claim 14 wherein aluminum alkoxide is hydrolyzed and aged to form quasi-crystalline boehmite containing additive.

20. The process of claim 14 wherein one or more soluble aluminum salts are hydrolyzed and precipitated as a hydroxide and aged to form a quasi-crystalline boehmite containing additive.

21. The process of claim 14 wherein said alumina source comprises thermally treated aluminum, trihydrate that has been rehydrated in water in the presence of an additive and the resulting slurry aged at a temperature between 80 and 160° for a time sufficient to form quasi-crystalline boehmite.

22. The process of claim 14 wherein said alumina source comprises amorphous gel alumina slurried in water in the presence of an additive and the resulting slurry is aged at a temperature between 50 and 300° for a time sufficient to form quasi-crystalline boehmite.

23. The process of claim 14 wherein aging is carried out at a temperature from about 100° C. to 300° C. for a time from 0.25 hour to about 100 hours and under a pressure from atmospheric to an autogeneous pressure at temperatures above 100° C.

24. The process of claim 14 wherein hydrothermal aging is carried out at a temperature from about 120° C. to 200° C. for a time from about 0.25 hours to about 50 hours and under autogeneous pressure.

25. The process of claim 14 wherein said quasi-crystalline boehmite precursor is aluminum trihydrate with hydrothermal aging carried out in the presence of an additive to form quasi-crystalline boehmite.

26. The process of claim 14 wherein said process is conducted in a continuous mode.

27. The process of claim 14 wherein unconverted quasi-crystalline boehmite precursor and additive are removed from the homogeneously dispersed state and recycled.

28. The process of claim 27 wherein the unconverted quasi-crystalline boehmite precursor and additive are mechanically or chemically treated before recycle to reduce particle size of the particles comprising said unconverted quasi-crystalline boehmite precursor and additive and/or to increase the reactivity of the recycled quasi-crystalline boehmite precursor and additive in said process.

29. The process of claim 14 wherein quasi-crystalline precursors are selected from the group consisting of aluminum trihydrate, transition alumina, BOC, flash calcined BOC, bauxite, calcined bauxite, bayerite, flash calcined bauxite, gibbsite, amorphous alumina, calcined alumina, flash calcined trihydrate low crystallinity boehmite, alumina gels, alumina sols, soluble compounds containing alumina and mixtures thereof.

30. The process of claim 14 wherein a seeding material, crystalline or amorphous, is added to said quasi-crystalline boehmite precursor and additive in said reactor to promote the formation of said quasi-crystalline boehmite.

31. The process of claim 30 wherein said seeding material is selected from the group consisting of boehmite alumina, doped boehmite alumina, gel alumina, amorphous alumina, calcined alumina, silica-alumina, silica, magnesia, magnesia-silica, magnesia-silica-alumina, calcium silicates, calcium aluminates, calcium magnesium, lithium-alumina, magnesium-alumina, sodium-alumina-silica, sodium-calcium-magnesium, sodium-magnesium-alumina-silica, seeds used to synthesize zeolites, and mixtures thereof.

32. The process of claim 31 wherein said zeolite is selected from the group consisting of the pentasil-type, the faujasite-type and the large-pore mesopurous-type.

33. The process of claim 30 wherein said seeds are modified mechanically, thermally and/or chemically before use.

34. The process of claim 30 wherein said seeds are flash calcined gibbsite that has been hydrated in water in the presence of a sodium silicate additive before use as seeds.

35. The process of claim 30 wherein said seeds are flash calcined gibbsite hydrated in water to which caustic soda and a gelling agent has been added.

36. The process of claim 35 wherein said gelling agent is selected from the group consisting of synthetic smectite clays.

37. The process of claim 36 where in said synthetic smectite clays are selected from the group of clays consisting of saponite, laponite, bentonite, hectorite, montmorillonite and mixtures thereof.

38. The process of clam, 30 wherein said seeds comprise sodium-aluminum-silicates used in the formation of synthetic zeolites.

39. The process of claim 30 wherein said seeds are colloidal.

40. The process of claim 30 wherein said seeds comprise small particle zeolites containing sodium or ammonium or other exchangeable cations.

41. The process of claim 40 wherein said exchangeable cations are selected from the group consisting of rare earth and/or transition metal cations.

42. The process of claim 30 wherein said seeds comprise synthetic or natural clays.

43. The process of claim 30 wherein said seeds have been chemically modified by ion exchange, pillaring, exfoliation and/or delamination.

44. The process of claim 30 wherein said seeds comprise recycled quasi-crystalline boehmite alumina product.

45. The process of claim 16 wherein the precursor is shaped prior to or after aging to obtain shaped bodies.

46. The process of claim 45 wherein said shaped bodies are milled to obtain fine particles that are re-shaped with the addition of additives.

47. The process of claim 16 wherein said precursor is shaped after aging to obtain shaped bodies.

48. The process of claim 45 wherein the shaped bodies may be provided with desired functionalities by addition of appropriate additives.

49. The process of claim 45 wherein said shaping comprises spray drying, extrusion, palletizing or sphereizing.

50. The process of claim 45 wherein the shaped mixture is dried and calcined.

51. The process of claim 50 wherein said shaped bodies are milled to obtain fine particles that are re-shaped with the addition of additives.

52. The process of claim 45 wherein the calcined shaped mixture is impregnated with a solution of one or more metal salts comprising said additives.

53. The process of claim 45 wherein additives are incorporated into the mixture before shaping and aging.

54. The process of claim 16 wherein more than one aging step is used.

55. The process of claim 14 comprising the steps;
  a. Pretreating an alumina source with an acid to form a boehmite precursor,
  b. Adding a base or alkaline compound to said boehmite precursor in an amount at least sufficient to neutralize the acid of step a.; and
  c. Aging said boehmite precursor at a temperature above about 65° C. for a time sufficient to obtain said quasi-crystalline boehmite;
the additive being added to the boehmite precursor at one or more of steps a., b. or c.

56. The process of claim 55 wherein said boehmite precursor is aged before or after step b.

57. The process of claim 55 wherein the precursor is homogenized in one or more of steps a, b, or c by milling.

58. The process of claim 55 wherein said base or alkaline compound is selected from the group consisting of sodium hydroxide, lithium hydroxide, potassium hydroxide, ammonium hydroxide, sodium carbonate, sodium silicate, sodium aluminate, sodium metasilicate, sodium-containing phosphates, ammonium containing phosphates, magnesium hydroxide, calcium hydroxide and barium hydroxide.

59. A shaped particle comprising the composition of claim 1.

60. A catalyst composition comprising the composition of claim 1.

61. The catalyst composition of claim 60 wherein said composition also comprises a binder material.

62. A transition alumina obtained by thermal treatment of the composition of claim 1.

63. The transition alumina of claim 62 wherein additives are present in a homogeneously dispersed state, said additives being compounds containing elements selected from the group of alkaline earth metals, transition metals, actinides, noble metals, gallium, silicon, boron, titanium, and phosphorus.

64. The transition alumina of claim 62 wherein additives are present in a homogeneously dispersed state, said additives being compounds containing one or more rare earth metals and at least one additional additive.

65. A catalyst composition comprising the transition alumina of claim 62.

66. The catalyst composition of claim 60 herein said composition also comprises a binder material.

67. A process for the fluid catalytic cracking of hydrocarbons wherein said hydrocarbons are contacted with the composition of claim 1 at fluid catalytic cracking conditions.

68. A process for the hydroprocessing of hydrocarbons wherein said hydrocarbons are contacted with a composition comprising the composition of claim 1 at hydroprocessing conditions.

69. The process of claim 68 wherein said composition comprises a zeolite selected from the group consisting of zeolites of the pentasil-type, the faujasite-type and the large-pore mesoporous-type.

70. The process of claim 68 wherein said process for the hydroprocessing of hydrocarbons comprises hydrocracking wherein said hydrocarbons are contacted with a composition comprising the composition of claim 1 at hydrocracking conditions.

71. The process of claim 69 wherein said zeolite is impregnated with a solution of one or more salts of a rare earth and/or transition metal.

72. The catalyst of claim 60 comprising a Fischer Tropsch composition.

* * * * *